(12) United States Patent
Plunkett et al.

(10) Patent No.: US 9,964,236 B2
(45) Date of Patent: May 8, 2018

(54) MODULAR CONDUIT SYSTEM

(71) Applicants: Spectrum Catalyst, Inc., Ronkonkoma, NY (US); Plastik MP Inc., Richmond (CA)

(72) Inventors: Michael Plunkett, Port Jefferson, NY (US); Martin Pelchat, Melbourne (CA); Thomas Craig, South Hadley, MA (US)

(73) Assignee: SPECTRUM CATALYST, Ronkonkoma, NY (US)

( * ) Notice: Subject to any disclaimer, the term of this patent is extended or adjusted under 35 U.S.C. 154(b) by 266 days.

(21) Appl. No.: 14/731,979

(22) Filed: Jun. 5, 2015

(65) Prior Publication Data

US 2015/0354730 A1    Dec. 10, 2015

Related U.S. Application Data

(60) Provisional application No. 62/008,255, filed on Jun. 5, 2014.

(51) Int. Cl.
*F16L 9/22* (2006.01)
*F16L 9/00* (2006.01)
(Continued)

(52) U.S. Cl.
CPC ............... *F16L 9/003* (2013.01); *F16L 9/22* (2013.01); *F16L 21/08* (2013.01);
(Continued)

(58) Field of Classification Search
CPC ... F16L 9/003; F16L 9/22; F16L 21/08; F16L 27/0849
(Continued)

(56) References Cited

U.S. PATENT DOCUMENTS 760,347 A * 5/1904 Petersen ................. F16L 9/22
138/157
913,482 A * 2/1909 Ette ......................... F16L 9/003
138/149
(Continued)

FOREIGN PATENT DOCUMENTS

| CN | 2678220 Y | 2/2005 |
| GB | 2267722 A | 12/1993 |
| WO | 2005/045296 A1 | 5/2005 |

OTHER PUBLICATIONS

International Search Report and Written Opinion of the International Searching Authority, dated Oct. 2, 2015, corresponding to International Application No. PCT/US2015/034489; 23 total pages.
(Continued)

*Primary Examiner* — Paul R Durand
*Assistant Examiner* — Michael J Melaragno
(74) *Attorney, Agent, or Firm* — Carter, DeLuca, Farrell & Schmidt, LLP

(57) ABSTRACT

A modular conduit system is provided which includes at least one longitudinally extending shell component including an interior wall and an exterior wall, a first longitudinally extending edge, a second opposed longitudinally extending edge, an engagement tab located adjacent the first longitudinal edge, an engagement slot located adjacent the second longitudinally extending edge, the engagement slot having an enlarged portion and a narrow portion, the enlarged portion configured to receive an engagement tab from another longitudinally extending shell, the narrow portion configured to interfere with removal of the tab in a direction transverse to the slot. The longitudinally extending shells are combinable to form a conduit member which are themselves combinable to form a longitudinally extending array of conduit members. Swiveling elbow joints may be inserted between conduit members to provide changes in direction.
(Continued)

Also provided are interengaging panels that cooperate to form containment barriers and which are configured to allow conduit members to pass into or out of the containment barriers.

51 Claims, 20 Drawing Sheets

(51) Int. Cl.
| | |
|---|---|
| *F16L 21/08* | (2006.01) |
| *F16L 27/08* | (2006.01) |
| *F16L 43/00* | (2006.01) |
| *H02G 3/04* | (2006.01) |
| *H02G 3/06* | (2006.01) |
| *F16L 57/02* | (2006.01) |
| *F16L 57/06* | (2006.01) |

(52) U.S. Cl.
CPC ............ *F16L 27/0849* (2013.01); *F16L 43/00* (2013.01); *H02G 3/0462* (2013.01); *H02G 3/06* (2013.01); *F16L 57/02* (2013.01); *F16L 57/06* (2013.01)

(58) Field of Classification Search
USPC .......................................................... 138/155
See application file for complete search history.

(56) References Cited

U.S. PATENT DOCUMENTS

| | | | | |
|---|---|---|---|---|
| 954,234 | A * | 4/1910 | Wilkinson | F16L 9/003 138/151 |
| 1,443,292 | A * | 1/1923 | Sweney | F16L 9/003 285/330 |
| 2,910,308 | A | 10/1959 | Carr | |
| 3,066,959 | A | 12/1962 | White | |
| 3,161,722 | A * | 12/1964 | Wellens | H02G 3/0418 138/155 |
| 3,363,050 | A * | 1/1968 | Martin | H02G 3/045 138/155 |
| 3,425,456 | A | 2/1969 | Schibig | |
| 3,697,667 | A | 10/1972 | Pollak et al. | |
| 3,732,894 | A | 5/1973 | Botsolas | |
| 4,105,051 | A | 8/1978 | Visentin | |
| 4,260,181 | A | 4/1981 | Curtin | |
| 4,374,596 | A | 2/1983 | Schlemmer et al. | |
| 4,944,976 | A | 7/1990 | Plummer, III | |
| 4,967,800 | A | 11/1990 | Heilmayr et al. | |
| 5,022,685 | A | 6/1991 | Stiskin et al. | |
| 5,882,140 | A | 3/1999 | Yodock, Jr. et al. | |
| 5,938,370 | A | 8/1999 | Gzybowski | |
| 6,059,491 | A | 5/2000 | Striefel et al. | |
| 6,247,500 | B1 | 6/2001 | McMahon | |
| 6,390,139 | B1 * | 5/2002 | Kang | F16L 9/22 138/120 |
| 8,167,512 | B2 | 5/2012 | Christensen | |
| 8,491,217 | B2 | 7/2013 | Kulp et al. | |
| 2006/0213572 | A1 * | 9/2006 | Beaulieu | F16L 59/024 138/155 |
| 2011/0296778 | A1 | 12/2011 | Collins et al. | |
| 2011/0309612 | A1 * | 12/2011 | Vautour | F16L 9/22 285/179 |
| 2015/0354730 | A1 * | 12/2015 | Plunkett | H02G 3/0462 138/155 |
| 2016/0178096 | A1 * | 6/2016 | Courpet | F16L 27/026 285/18 |
| 2016/0178098 | A1 * | 6/2016 | Felber | F16L 21/08 285/236 |

OTHER PUBLICATIONS

International Preliminary Report on Patentability and Written Opinion of the International Searching Authority, dated Dec. 6, 2016, corresponding to International Application No. PCT/US2015/034489; 15 total pages.

* cited by examiner

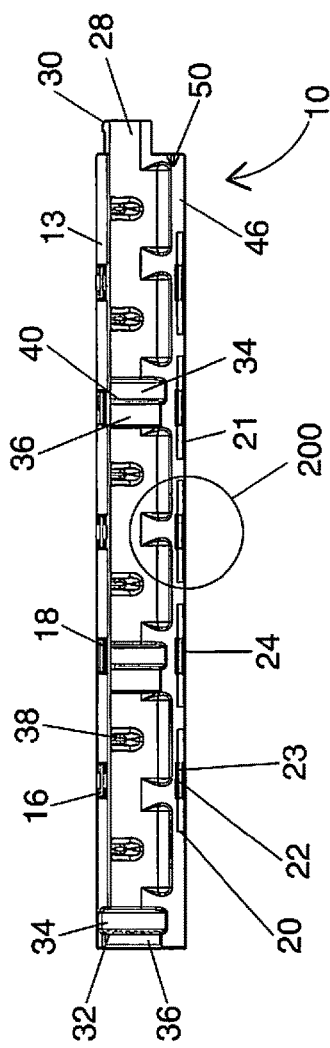
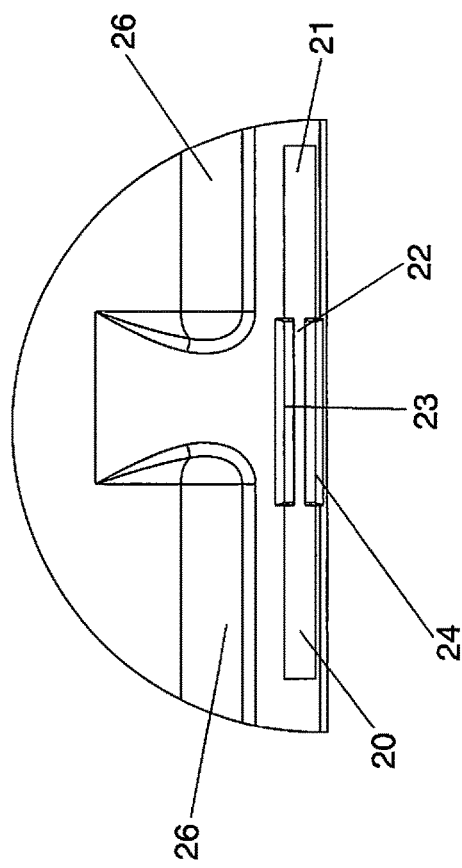
FIG. 5
FIG. 6

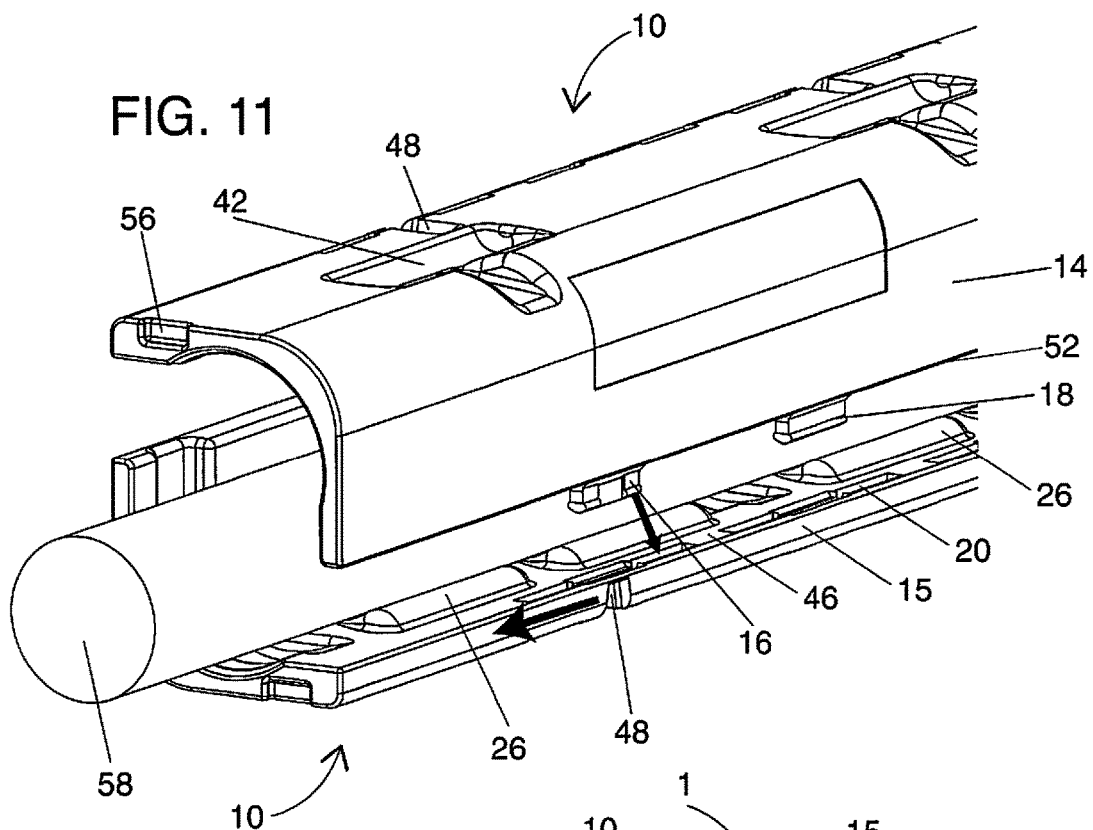
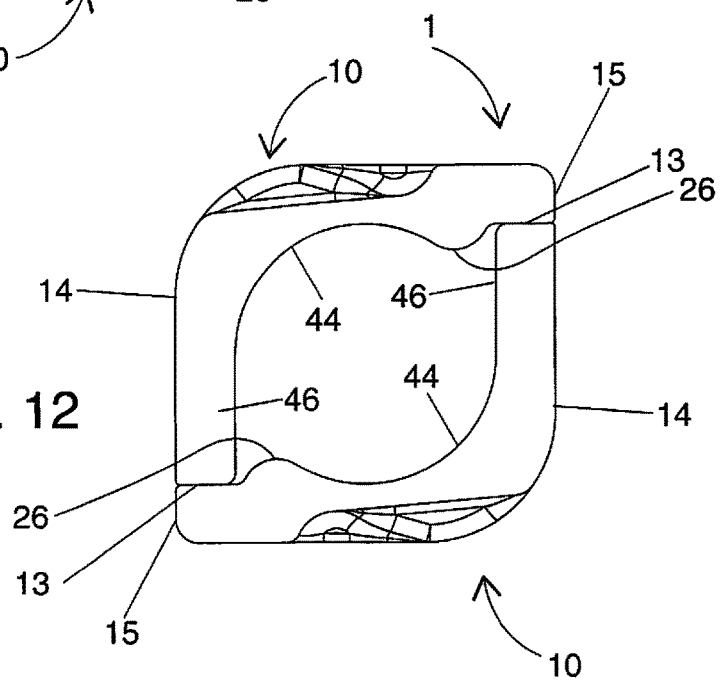

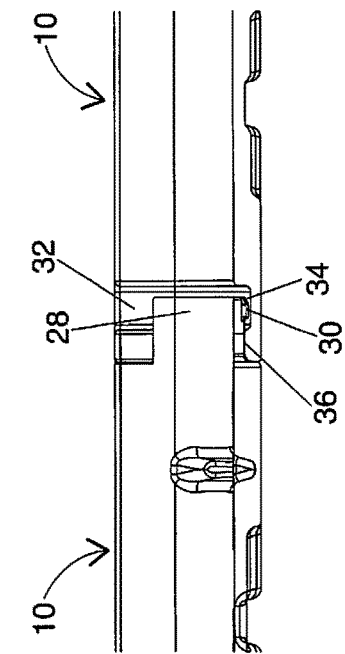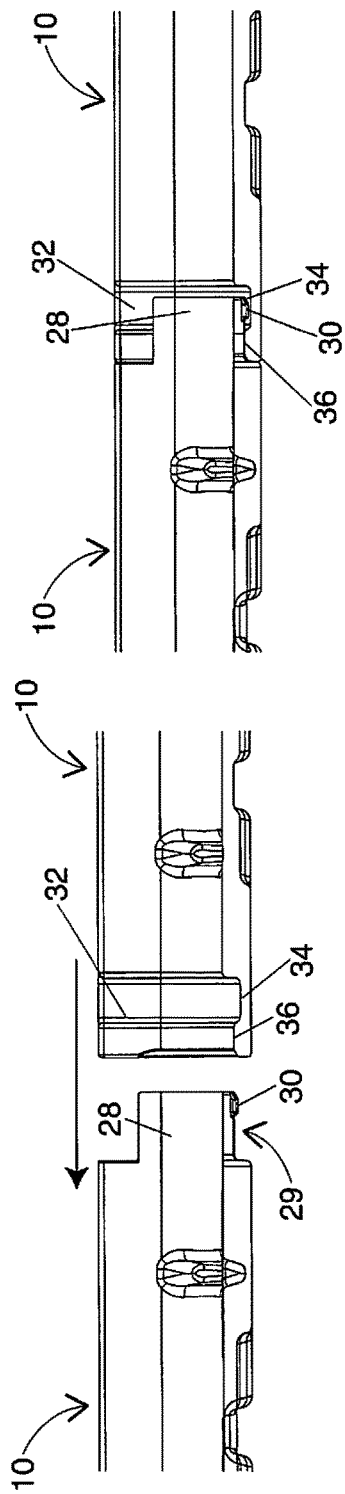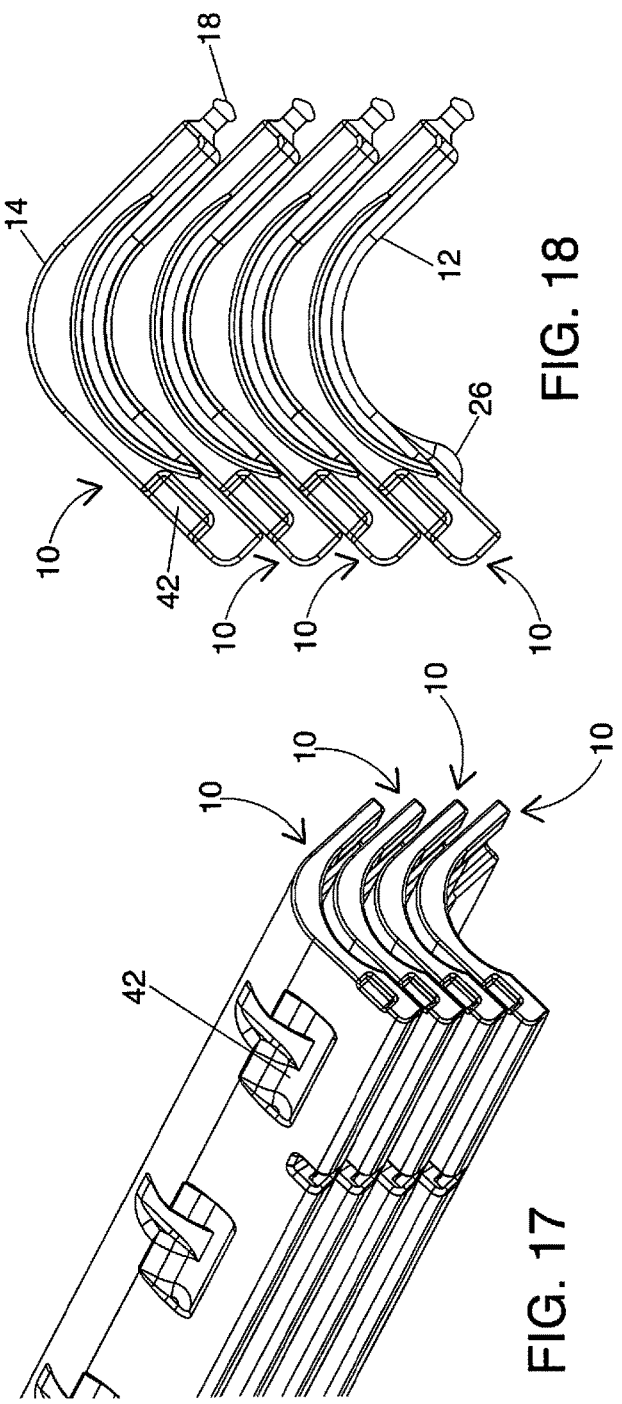
FIG. 15
FIG. 16
FIG. 17
FIG. 18

MODULAR CONDUIT SYSTEM

CROSS-REFERENCE TO RELATED APPLICATIONS

This application claims priority to U.S. Provisional Application No. 62/008,255, filed Jun. 5, 2014, the entire contents of which are incorporated herein by reference.

BACKGROUND

1. Technical Field

The present disclosure relates to conduit containment systems for cables, ducts and pipes.

2. Related Art

Electrical cables, fiber optic cables, gas pipes, water pipes can be delicate and subject to damage, or be hazardous under certain circumstances. For example, electrical utilities may repair damaged or failed electrical cables located in conduits underground. In some instances it may be necessary to place a high voltage electrical cable bypass on a road or sidewalk surface when, for example, pulling the damaged cable or trenching and installing a new cable is not feasible. A bypass may also be referred to as a shunt. In some instances, a bypass can be used to reroute a cable transmission around a problem area while repairs are made to the problem area. In many instances the bypass must be protected against external elements. For example, the presence of a bypass on open ground may present a hazard for motorists, bicyclists and pedestrians. Accordingly, a protective conduit may be used in an attempt to protect the bypass and/or pedestrians from tripping and falling over the bypass or from electrocution. A protective conduit may also be used to help guard the bypass against snagging or collision with motor vehicles. Another problem that a protective conduit may guard against is cable theft by preventing access to the cable.

SUMMARY

A modular conduit system is provided which includes at least one longitudinally extending shell component including an interior wall and an exterior wall, a first longitudinally extending edge, a second opposed longitudinally extending edge, the interior wall defining an arcuate portion between the first longitudinally extending edge and the second longitudinally extending edge, an engagement tab located adjacent the first longitudinal edge, an engagement slot located adjacent the second longitudinally extending edge, the engagement slot having an enlarged portion and a narrow portion, the enlarged portion configured to receive an engagement tab from another longitudinally extending shell, the narrow portion configured to interfere with removal of the tab in a direction transverse to the slot.

A modular conduit system is provided which includes first and second longitudinally divided shells engageable to form a conduit member defining a longitudinal bore, the first shell having an interior wall and an exterior wall, the second shell having an interior wall and an exterior wall, the first shell including a first engagement structure and the second shell including a second engagement structure wherein the first and second engagement structures are configured to form a longitudinally sliding interlock which interferes with separation of the longitudinally divided shells of the conduit member. In embodiments, the first engagement structure is a tab located adjacent a longitudinal edge of the first longitudinally divided shell, the tab having an expanded portion, and the second engagement structure defines a slot having an enlarged portion and a narrow portion. In embodiments, the expanded portion of the tab has a dimension smaller than the enlarged portion of the slot and the expanded portion of the tab has a dimension larger than the narrow portion of the slot such that the tab is receivable in the enlarged portion of the slot and movable through the slot into the narrow portion of the slot to engage the narrow portion of the slot and releasably secure the first shell to the second shell. In embodiments, the second engagement structure defines a slot having enlarged portions disposed at opposite ends of the slot which are separated by the narrow portion. In embodiments, the first shell has a plurality of first engagement structures located adjacent the longitudinal edge and the second shell defines a plurality of second engagement structures which are configured to form a plurality of discrete sliding interlocks. In embodiments, the first shell includes both the first engagement structure and the second engagement structure and the second shell includes both the first engagement structure and the second engagement structure. In embodiments, the first shell has an interior wall and an exterior wall. In embodiments, the slot is disposed on an interior wall of the second shell such that when the tab is in the narrow portion of the slot, a portion of the tab extends through an aperture located on an exterior wall of the second shell. In embodiments, the portion of the tab which extends through the aperture located on the exterior wall of the second shell has an aperture configured to receive an obstruction, thereby preventing longitudinal movement of the first shell relative to the second shell when the shells are engaged to form the conduit member.

In embodiments, the interior wall and the exterior wall are separated by a cavity thereby forming a double walled construct. In embodiments, the interior wall defines an arcuate portion extending longitudinally along the length of the first shell. In embodiments, the exterior wall defines an L-shaped cross-section. In embodiments, the interior wall defines one or more retainers dimensioned and configured to maintain a cable in position along the longitudinal bore. In embodiments, the interior wall defines one or more retainers dimensioned and configured to maintain a cable in position against the arcuate portion.

In embodiments, the conduit member has a first end portion and a second end portion, the first end portion including a first coupling and the second end portion including a second coupling. In embodiments, the first and second couplings are dimensioned and configured to couple together by a friction fit. In embodiments, the friction fit is a snap fit. In embodiments, the first coupling includes a cantilever extending longitudinally from the first end, the cantilever having a lug disposed thereon. In embodiments, the second coupling is dimensioned and configured to receive the cantilever and the lug, the lug dimensioned and configured to mate with a depression defined in the second coupling. In embodiments, the first shell defines a first portion of the first coupling and the second shell defines a second portion of the first coupling. In embodiments, the first shell defines a first portion of the second coupling and the second shell defines a second portion of the second coupling.

In embodiments, the interior wall defines at least one support member extending from the interior wall into the cavity, the support member dimensioned and configured to buttress the exterior wall from within the cavity. In embodiments, a nesting indent is formed on the exterior wall, the nesting indent dimensioned and configured to receive a retainer disposed on the interior wall. In embodiments, the interior wall of the first shell is complementary to the exterior wall of the second shell, thereby allowing the first shell to fit over and against the second shell and form a stack, whereby the nesting indent and the retainer cooperate to stabilize the stack. In embodiments, the conduit member defines a contiguous interior wall formed from the interior wall of the first shell and the second shell, the contiguous inner wall defining a spare second coupling located between the first and second end portions. In embodiments, the first shell defines a first portion of the spare second coupling and the second shell defines a second portion of the spare second coupling.

In embodiments, the modular conduit system includes a first elbow joint dimensioned and configured to couple a first conduit member to a second conduit member. In embodiments, the first elbow joint is swivelably coupled to the first conduit member. In embodiments, the modular conduit system includes a second elbow joint dimensioned and configured to couple to the first elbow joint. In embodiments, the second elbow joint is swivelably coupled to the first elbow joint. In embodiments, the first elbow joint includes two divided shells engageable to form an elbow conduit member defining a bore from a first end portion of the first elbow joint through a second end portion of the elbow joint. In embodiments, the two divided shells are pivotally connected to one another. In embodiments, the two divided shells are pivotally connected to one another by a hinge. In embodiments, the conduit member has a first end portion and a second end portion, the first end portion including a first coupling and the second end portion including a second coupling, wherein the first end portion of the first elbow joint is dimensioned and configured to engage the first coupling of the conduit member when the two divided shells are closed. In embodiments, the first end portion of the first elbow joint is dimensioned and configured to cover and swivelably engage the first coupling of the conduit member when the two divided shells are closed thereby preventing disassembly of the conduit member and the first elbow joint.

In embodiments, the conduit member has a first end portion and a second end portion, the first end portion including a first coupling and the second end portion including a second coupling, wherein the second end portion of the first elbow joint is dimensioned and configured to engage the second coupling of the conduit member when the two divided shells are closed. In embodiments, the second end portion of the first elbow joint is dimensioned and configured to fit within and be swivelably engaged by the second coupling of the conduit member when the two divided shells are closed thereby preventing disassembly of the conduit member and the first elbow joint.

In embodiments, the first elbow joint includes two divided shells engageable to form an elbow conduit member defining an bore from a first end portion of the first elbow joint through a second end portion of the first elbow joint, and the second elbow joint includes two divided shells engageable to form a second elbow conduit member defining an bore from a first end portion of the second elbow joint through a second end portion of the second elbow joint, the first end portion of the first elbow joint including a first coupling and the second end portion of the first elbow joint including a second coupling, the first end portion of the second elbow joint including a first coupling and the second end portion of the second elbow joint including a second coupling, wherein the first end portion of the second elbow joint is dimensioned and configured to engage the second coupling of the conduit member when the two divided shells of the second elbow joint are closed. In embodiments, the first end portion of the second elbow joint is dimensioned and configured to cover and swivelably engage the second coupling of the first elbow joint when the two divided shells of the second elbow joint are closed thereby preventing disassembly of the first elbow joint and the second elbow joint. In embodiments, the elbow joint includes a interlock that prevents separation of the divided shells.

In embodiments, a first conduit member is coupled to a second conduit member, the first coupling of the first conduit member being coupled to the second coupling of the second conduit member. In embodiments, the second coupling of the first conduit member is coupled to a first coupling of the first elbow joint and a second coupling of the first elbow joint is coupled to the first coupling of the second conduit member. In embodiments, the second coupling of the first conduit member is coupled to a first coupling of the first elbow joint and a second coupling of the first elbow joint is coupled to a first coupling of second elbow joint, the second elbow joint having a second coupling dimensioned and configured to couple to the first coupling of the second conduit member.

In embodiments, the modular system includes a plurality of interengaging panels that cooperate to form an enclosed containment area, one or more of the panels including a conduit member receiving port dimensioned and configured allow the conduit member to pass through the panels. In embodiments, a first panel has a top portion, a bottom portion, a first side portion and an opposed second side portion, a second panel has a top portion, a bottom portion, a first side portion and an opposed second side portion wherein the first side portion of the first panel includes a first engagement structure and second side portion of the second panel includes a second engagement structure wherein the first and second engagement structures are configured to form a hinge which defines one or more fixed relative panel positions. In embodiments, the first engagement structure includes a first stop and the second engagement structure includes a first stop, the first stop of the first engagement structure and first stop of the second engagement structure cooperating to define the one or more fixed relative panel positions. In embodiments, the second side portion of the first panel includes a first engagement structure and the first side portion of the second panel includes a second engagement structure wherein the first and second engagement structures are configured to form a vertically sliding interlock for linking adjacent panels together. In embodiments, the second side portion of the first panel includes a first lock receptor and the first side portion of the second panel includes a second lock receptor, wherein the first lock receptor and second lock receptor are configured to receive a lock and cooperate to prevent disassembly of linked adjacent panels. In embodiments, the panels include a closure for the port. In embodiments, the closure is a pivoting door, a slidable door, or a door that is pivotable and slidable. In embodiments, one or more of the panels has a top portion, a bottom portion, a first side portion and an opposed second side portion, the bottom portion including an anchoring flange. In embodiments, one or more of the panels is hollow and configured to be filled with a fluid material for ballast. In embodiments, the plurality of interengaging panels cooperates to form a wall having a zig-zag configuration.

BRIEF DESCRIPTION OF THE DRAWINGS

FIG. 5 is a side view of the interior of a longitudinally divided shell in accordance with the present disclosure highlighting a portion of the shell.

FIG. 6 is an enlargement of the highlighted portion in FIG. 5 illustrating a slot of a second engagement structure in accordance with the present disclosure.

FIG. 11 is a perspective partial view of first and second longitudinally divided shells in vertical juxtaposition surrounding a portion of a cable and illustrating placement and operation of a longitudinally sliding interlock and assembly of a conduit member in accordance with the present disclosure.

FIG. 12 is a cross-sectional view of two interlocked divided shells in accordance with the present disclosure.

FIG. 15 is a side view schematic of a first containment member and a second containment member in position for assembly of a first coupling of the first containment member to a second coupling of the second containment member, an arrow indicating direction of movement of the second containment member in accordance with the present disclosure.

FIG. 16 is a side view schematic of the first and second containment members shown in FIG. 15 in an assembled configuration in accordance with the present disclosure.

FIG. 17 is a partial perspective view of a plurality of longitudinally divided shells in a stacked arrangement in accordance with the present disclosure.

FIG. 18 is a cross-sectional view of the stacked arrangement shown in FIG. 17.

DETAILED DESCRIPTION

In general, a modular conduit herein is formed from a plurality of longitudinally extending shells which couple together. In embodiments, the shells can be assembled facing each other, e.g., one over another to form a single conduit member. In embodiments, the shells can be assembled along a horizontal axis to form a contiguous longitudinal array. Each shell has at least one engagement member configured to cooperate with at least one engagement member of a complementary shell to form a longitudinally sliding interlock that interferes with disassembly of the two shells of a conduit member. Each shell has at least a portion of one or more couplings for assembling the shells and/or conduit members longitudinally.

Figure 10:
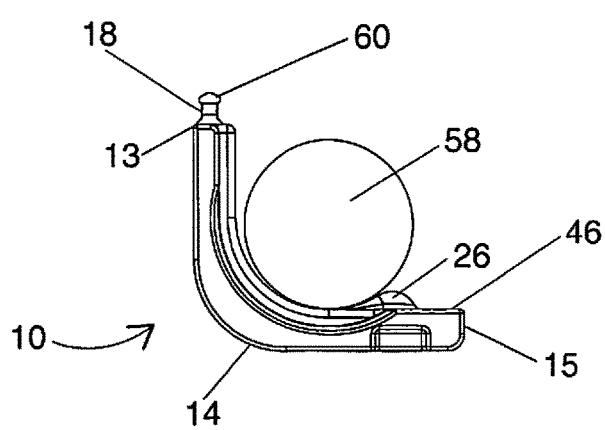
FIG. 10 is a cross-sectional view of a longitudinally divided shell and cable in accordance with the present disclosure.

Embodiments of the presently disclosed modular conduit system will now be described in detail with reference to the drawings wherein like numerals designate identical or corresponding elements in each of the several views. As seen, e.g., in FIGS. 1 through 6, a longitudinally extending shell (generally designated by the numeral 10) includes an interior wall 12 and an exterior wall 14. The walls 12, 14 are bounded by a first longitudinally extending edge 13 and a second longitudinally extending edge 15. In embodiments, the walls 12, 14 are separated by a cavity, thus forming a double-wall construct. Methods of forming double walled constructs are well-known, e.g, twin sheet vacuum form processes and the like. In embodiments, the interior wall 12 and the exterior wall 14 can have different cross-sectional aspects. As can be see, e.g., in FIGS. 10 and 12, a portion of the interior wall 12 may define an arcuate cross-section, further defining an arcuate surface 44 extending along the length of a shell 10. An arcuate interior surface 44 can support or cradle a round cable 58 residing in a conduit member. In embodiments, retainers 26 are located on the interior wall 12 which also support and maintain the position of a cable on a shell 10 and/or in a conduit member 1. In embodiments, the exterior wall 14 may define an L-shaped cross-section, thus presenting flattened surfaces which can be resistant to rolling.

Locking tabs 16 and tabs 18 are located adjacent the first longitudinally extending edge 13. Engagement slots 20 are located adjacent the second longitudinally extending edge 15. In embodiments, the slots 20 are located on a flattened portion 46 adjacent the second longitudinally extending edge 15. Slots 20 include an enlarged portion 21 and a narrow portion 22 bounded by flanges 23 and 24. It should be understood that, in embodiments, the slots may include one enlarged portion 21 and one narrow portion 22. In embodiments, the slots may also include two enlarged portions 21 separated by a narrow portion 22. In embodiments, a single slot may include a plurality of enlarged portions and a plurality of narrow portions. The locking tabs 16 and tabs 18 have an expanded portion 60 (see, e.g., FIG. 10) having a dimension smaller than the enlarged portion 21 of slot 20, allowing tabs 16,18 to be inserted into the slots 20 of another shell 10.

Accordingly, when assembling a conduit member 1 (see, e.g., FIGS. 11-13), the tabs, 16, 18 of a first shell are aligned over the enlarged portions of the slots 21 of a second shell and inserted into the slots 20. The shell 10 is then slid longitudinally along the slots 20 until the expanded portions 60 nest under the narrow portion 22 of the slot 20, thus preventing transverse removal of the tabs 16,18 from the slot. The tabs 16, 18 can have any number of shapes that permit the tabs 16, 18 to slide within the slot while providing a projection that engages the narrow portion 22 to prevent transverse removal of the tabs 16, 18 from the slots 20. For example, the tabs can be T-shaped, fan-shaped, bulbous, etc.

In embodiments, a first shell can contain a first engagement structure on the first longitudinal edge, e.g., tabs or locking tabs or both tabs and locking tabs, but no second engagement structure on the second longitudinal edge, e.g., a slot, while a second shell contains a second engagement structure on the second longitudinal edge, but no first engagement structure on the first longitudinal edge. In this circumstance, when the first and second shells are aligned and the first engagement structure engages the second engagement structure to form a conduit member, only the edges of the shells on one side of the conduit member will be interlocked, i.e., the abutting longitudinal edges on the opposite side would not be interlocked. In embodiments, abutting longitudinal edges on both sides of the conduit member contain both sets of engagement structures and the edges of the shells are interlocked on both sides of the conduit member.

Each shell 10 has a portion of a first coupling 28 located at one end portion of the shell and a portion of a second coupling 32 located at an opposite or second end portion of the shell. When two shells 10 are engaged to form a conduit member, each respective portion of the first coupling 28 is complementary to the other and, when engaged, combine to form a first coupling 29. Each respective portion of the second coupling 32 is complementary to the other and, when engaged, combine to form a second coupling 33. The first and second couplings 29, 33 allow conduit members 1 to link longitudinally. In embodiments, the first coupling 29 is a cantilever received by the second coupling 33. In embodiments, the first coupling 29 defines a tube shape. In embodiments, the first coupling 29 includes at least one lug 30. In embodiments, the second coupling 33 includes a depression 34 for receiving one or more lugs 30. In embodiments, the depression 34 forms an annular channel configured to receive one or more lugs located in spaced relation around the perimeter of the coupling 29. A stop 36 helps maintain the lugs 30 in the depression 34 and provides resistance against disengagement of the couplings 29, 33. When engaged, the first and second couplings 28, 32 define a friction fit that resists disengagement. In embodiments, the friction fit is a snap fit.

Figure 1:
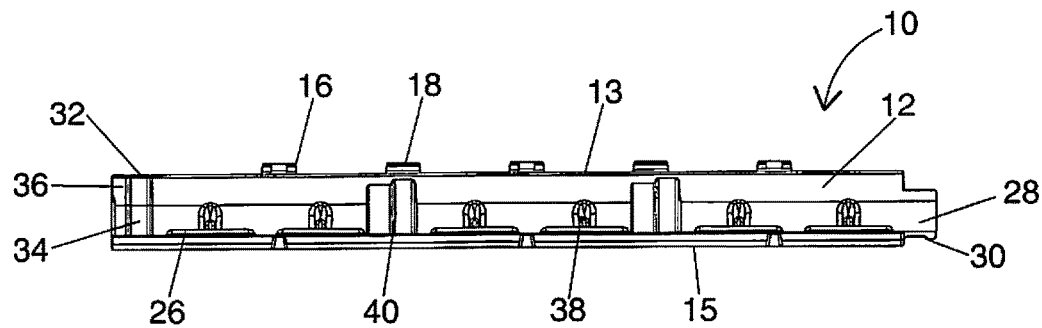
FIG. 1 is a side view of the interior of a longitudinally divided shell in accordance with the present disclosure.
Figure 2:
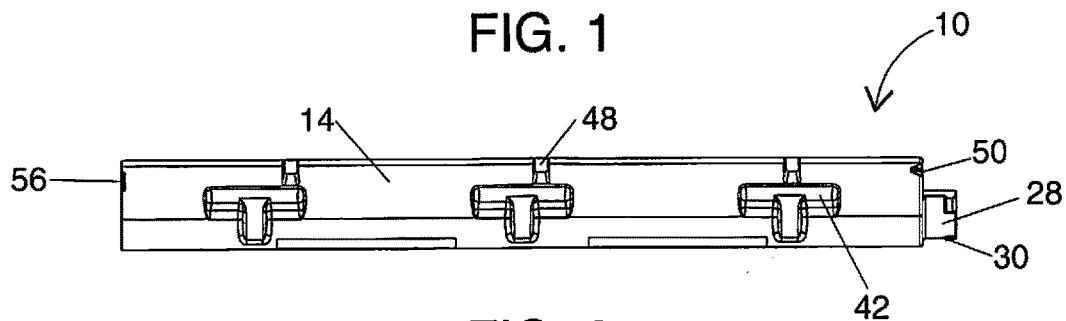
FIG. 2 is a side view of the exterior of a longitudinally divided shell in accordance with the present disclosure.
Figure 3:
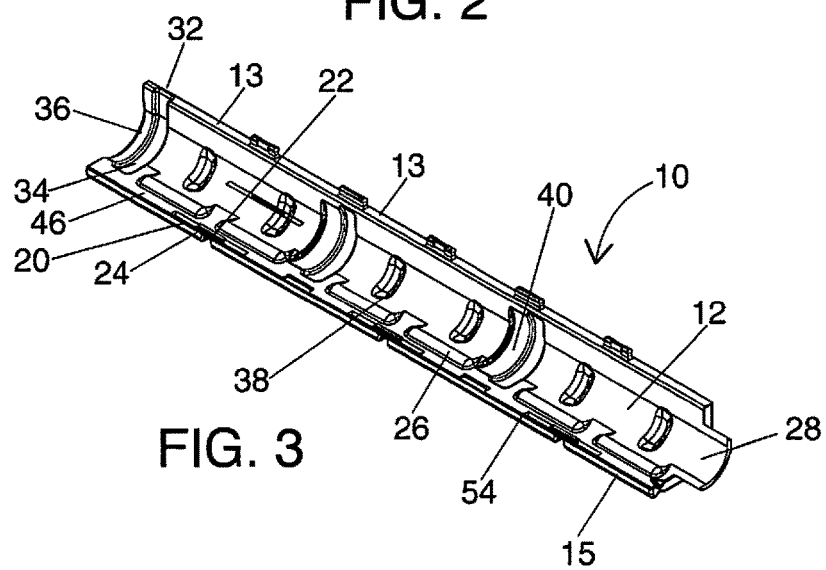
FIG. 3 is a perspective view of the interior of a longitudinally divided shell in accordance with the present disclosure.
Figure 4:
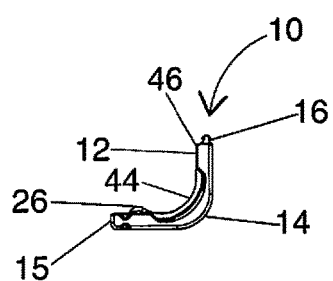
FIG. 4 is a cross-sectional view of a longitudinally divided shell in accordance with the present disclosure.
Figure 7:
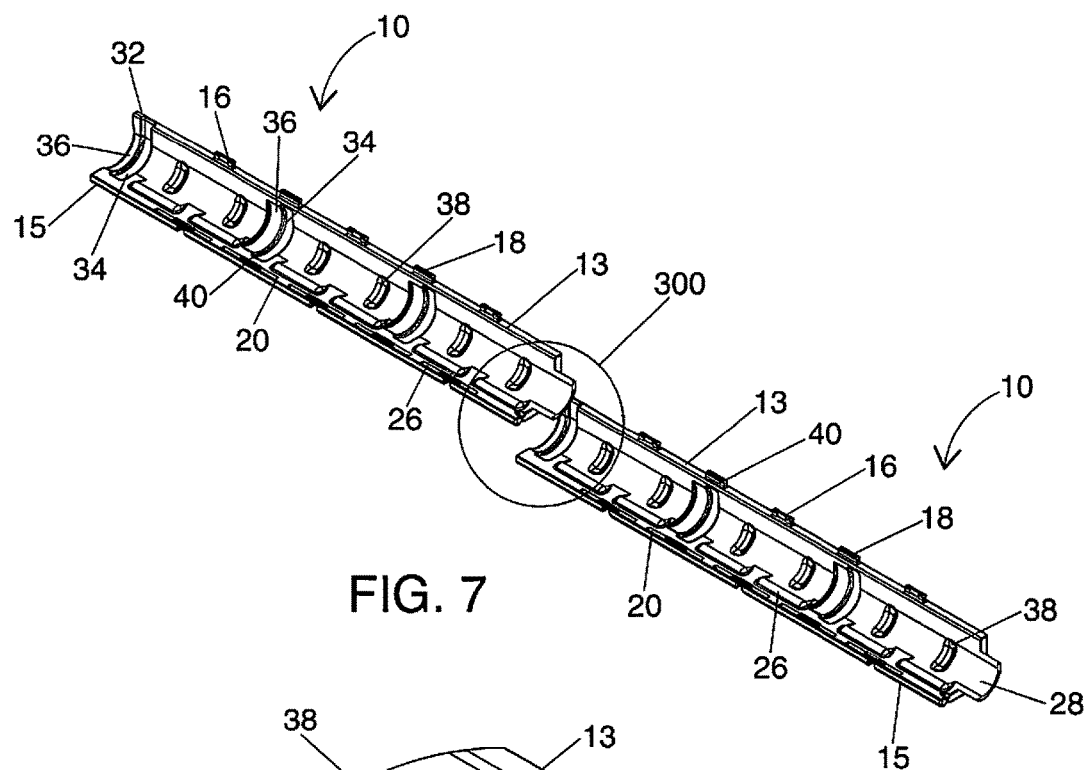
FIG. 7 is a perspective view of the interiors of two divided shells in juxtaposition and highlighting an area where the two divided shells are configured to couple in accordance with the present disclosure.
Figure 8:
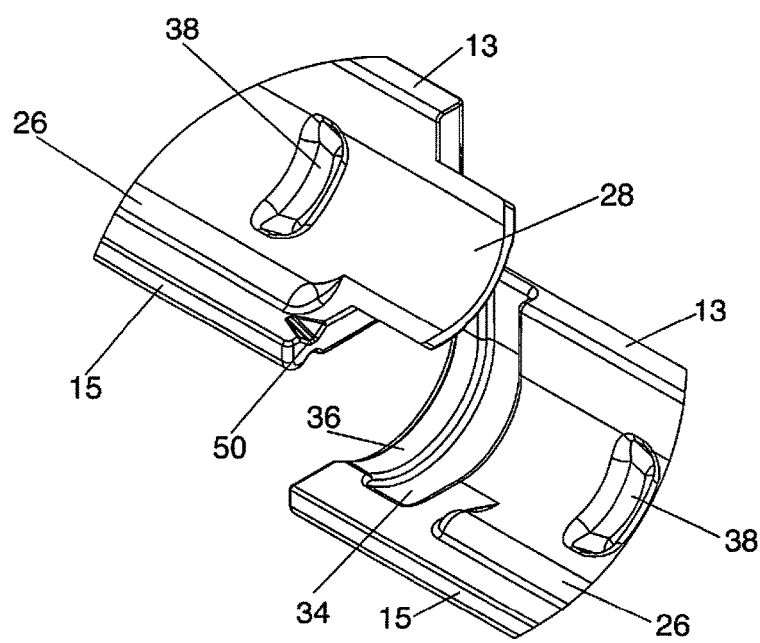
FIG. 8 is an enlargement of the highlighted portion in FIG. 7 illustrating a portion of a first coupling of the first shell juxtaposed over a second coupling of the second shell in accordance with the present disclosure.
Figure 9:
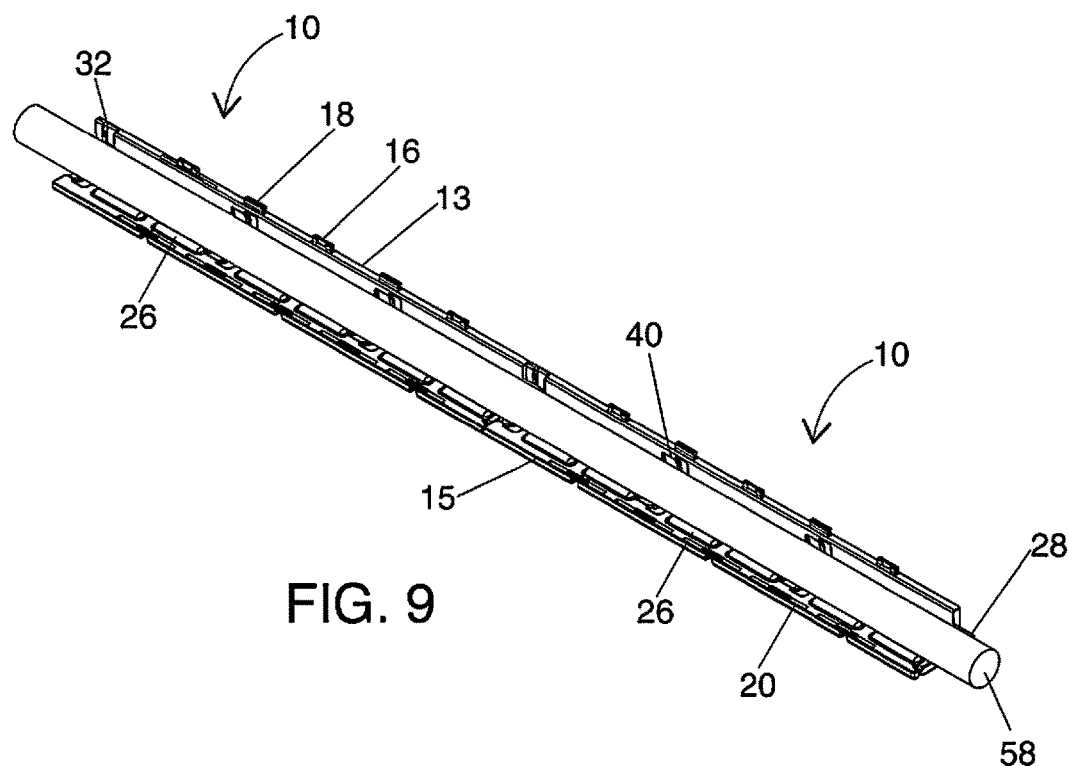
FIG. 9 is a perspective view of two contiguous divided shells and a portion of a cable situated on the shells in accordance with the present disclosure.

As can be seen in FIGS. 7 through 9, assembling a conduit in accordance with the present disclosure may involve positioning two or more shells 10 longitudinally end to end so that the interior walls 12 of each shell 10 face up. The first coupling portion 28 of a first shell is placed over the second coupling portion 32 of an adjacent second shell 10 such that lug(s) 30 are nested in the second coupling depression. See, e.g., FIGS. 7, 8, 15 and 16. Any number of shells 10 may be so positioned end to end. The cable 52 is then placed adjacent the arcuate portion of the interior wall 12 of each shell 10. See, e.g., FIGS. 9 and 10. The retainer 26 is seen to provide a further support surface.

As FIG. 11 illustrates, a third shell 10 is positioned over the first shell 10 so that the interior wall faces toward the interior wall of the first shell 10 and over the cable 58 and the longitudinally extending edges of the opposed shells are in alignment. The third shell 10 is longitudinally offset in relation to the first shell so that tabs, 16, 18 of the third shell are aligned over the enlarged portions 21 of the slots 20 of the first shell and then inserted therein. The shell 10 is then slid longitudinally along the slots 20 until the expanded portions 60 nest under the narrow portions 22 of the slots 20, thus preventing transverse removal of the tabs 16,18 from the slots 20. In embodiments, the shells are constructed so that orientation of the tabs 18 and locking tabs 16 in the narrow portions 22 of the slots aligns the first coupling portion 28 of the first shell with the first coupling portion 28 of the third shell as well as the second coupling portion 32 of the first shell 10 with the second coupling portion 32 of the third shell 10 to define the first coupling 29 and the second coupling 33. FIG. 12 illustrates a cross-section of an assembled conduit member 1 in the absence of a cable occupying the bore. In embodiments, slots 20 have the narrow portion 22 at one end and the enlarged portion 21 at the other. In order to align the third shell over the first shell, the third shell is offset in relation to the first shell in the direction of the enlarged portion 21 to allow the tabs and or locking tabs to enter the slot. In embodiments, the narrow portion 22 of the slot 20 is located between two enlarged portions. This arrangement allows the third shell to be offset in two different directions relative to the first shell., i.e., in order to align the third shell over the first shell, the third shell can be offset in the direction of either enlarged portion relative to the narrow portion. It should be understood that the first shell can be moved relative to the third shell to interlock the shells and that use of the term "over" is used for illustration since, e.g., the shells can be rotated and made to stand up so that one end faces down and the other end faces up and the longitudinal edges of the shells are brought into contact by horizontal movement.

After a conduit member 1 is formed by interlocking two shells, additional linked conduit members 1 may be formed along the contiguously upward facing shells by aligning successive opposed shells over the slots 20 and using the sliding interlock formed by the locking tabs and/or tabs and slots to form successive conduit members. See, e.g., FIGS. 9, 15 and 16. Sliding of the shells may be accomplished, e.g., by hand or by using a mallet to hammer to hit the open end of the shell 10, thus propelling it to move longitudinally along the slots. As the shell 10 moves along the slots, the first coupling receives the portion of the second coupling as it forms the second coupling and further forms the friction fit between the first and second couplings. See, e.g., FIGS. 15 and 16. In embodiments, a reinforcement zone 50 is incorporated into one or both ends of the shell. In embodiments, shown, e.g., in FIGS. 2, 5, 8 and 24, the reinforcement zone is defined by opposing notches disposed at one or both ends of the shell 10. The reinforcement zone 50 is capable of absorbing impact from a mallet or hammer while resisting crumpling or other damage.

In embodiments, the friction fit of the couplings provides enough play between engaged couplings of contiguous conduit members to allow them to flex relative to one another by about 1° to 10°. In embodiments, the degree of flex can range from 2° to 5°. In this manner, slight or gradual changes in direction can be accommodated.

Figure 13:
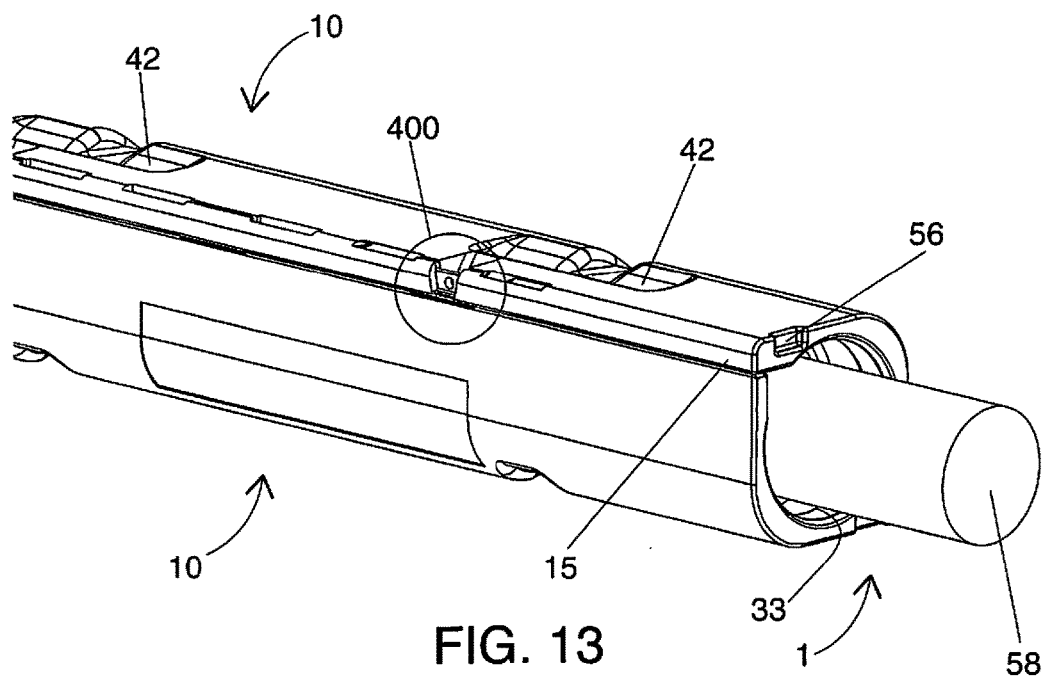
FIG. 13 is a partial perspective view of two interlocked divided shells forming a containment member around a cable, and illustrating a locking tab in a locking tab receiving cavity in accordance with the present disclosure.
Figure 14:
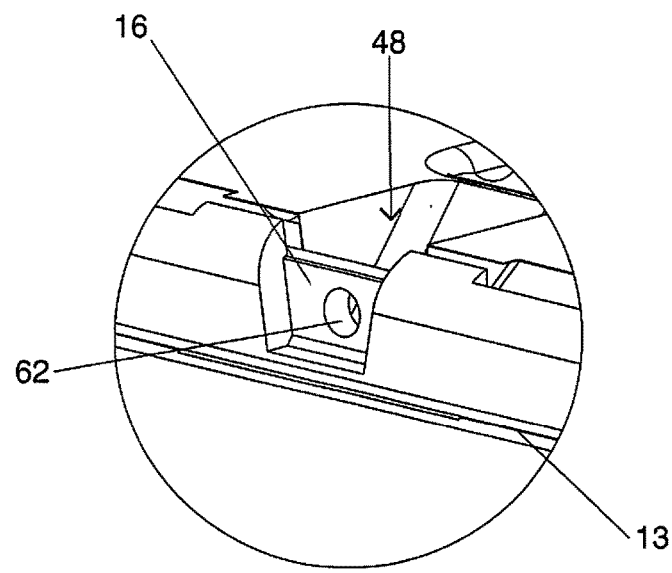
FIG. 14 is an enlargement of the highlighted portion in FIG. 13 illustrating the locking tab with the locking tab receiving cavity in accordance with the present disclosure.

As can be seen, e.g., from FIGS. 13 and 14, in embodiments, one or more locking tabs 16 are inserted into the slot 20 on the interior wall 12 and extend through an opening in the exterior wall 14. The locking tab 16 has an aperture 62 on a portion of the locking tab that extends past the opening 48 of the exterior wall and is exposed. In embodiments, the shell 10 has double wall construction, the slot(s) 20 being defined in the interior wall, the locking tab(s) 16 extending through the cavity between the interior wall 12 and the exterior wall 14 and through the opening 48. In embodiments, the opening 48 is contained within a partially enclosed cavity area defined on a portion of the exterior wall 14. An obstruction such as a pad-lock, plastic tie, bolt, rivet, and the like is passed through the aperture 62, which prevents the locking tab(s) 16 from being removed from the slot(s) 20 and, in embodiments, also cooperates with the walls defining the cavity to prevent longitudinal movement of, e.g., the first and third shells, relative to each other. In embodiments, locking a single conduit member contained in a longitudinal row of a plurality of conduit members prevents disassembly of the entire row since all the constituent shells will be precluded from movement sufficient to allow the tabs or locking tabs to access the enlarged portions 21 of the slots 20.

To disassemble a conduit member, one of the shells 10 is moved relative to the other shell 10 so that the tabs or locking tabs move from the narrow portions 22 of the slots 20, to the enlarged portions 21 of the slots. The shell is then pulled out of the slot, thus separating the two shells. In the case of a row of linked conduit members, a first shell is removed from an end of the row by sliding and releasing the slidable interlock and then the next shell adjacent the removed shell is removed in similar fashion and so on down the line. In embodiments, an access zone 56 is provided at one or more edges where two adjacent conduit members meet (see, e.g., FIG. 11). The access zone can be configured to receive, e.g., a pry bar which can be used as a lever to help separate the shells by overcoming the friction fit between couplings.

In embodiments, one or more supports 38, shown, e.g., in FIGS. 1, 3, 7 and 8, extend from the interior wall 12 of the double wall construct into the cavity between the interior wall 12 and exterior wall 14, and to the exterior wall 14, adding rigidity to the shell and buttressing the exterior wall. In embodiments, the supports 38 define pockets disposed on the arcuate surface 44 of the interior wall 12, further defining a series of outwardly extending ribs (not shown) along the interior wall 12.

Referring to FIGS. 17 and 18, in embodiments, the shells are configured to stack upon each other for storage or transport. Accordingly, a first shell 10 is placed interior wall 12 down. The interior wall 12 of a second shell nests against the exterior wall 14 of the first shell. Additional shells are positioned similarly. For example, the interior wall of a third shell nests against the exterior wall of the second shell and so on. In embodiments, the exterior wall includes one or more nesting indents 42 which are configured to receive corresponding protuberances disposed on the interior walls 12 of the shells. In embodiments, supports 26, which are protuberances, can be configured to have a dual function, e.g., 1) support a cable as described above, and 2) fit into the nesting indents 42, thus performing a stabilizing function when the shells are stacked.

In embodiments, the modular conduit system includes joint members which provide a change in direction between adjacent conduit members 1. Referring to FIGS. 19 through 28, an elbow joint 64 includes couplings which allow the elbow joint to couple to a first coupling 29, a second coupling 33, and to couplings of other elbow joints. In embodiments, the elbow joints swivel while attached to either end of the conduit members 1 or to other elbow joints 64. This allows on-site customization of the configuration of the modular conduit system. For example, an assembly of conduit members can be made to accept a cable or conduit coming up from underground, the elbow joint steering the cable from vertical to horizontal, or to accommodate any required turns or changes in elevation on open ground. In embodiments, the elbows 64 define a 45° turn, and can be used to turn right, left, upward, downward or to any desired direction. In embodiments, the elbow joint is divided into a first elbow portion 100 and a second elbow portion 102 which are complementary to one another and when combined form an elbow joint 64. In embodiments, the first elbow portion and the second elbow portion are pivotally connected to one another so they can join together and close in clamshell fashion.

In embodiments, an elbow joint 64 includes a first elbow coupling 66 at one end and a second elbow coupling 68 at the other end. The first elbow coupling 66 is configured to engage the first coupling 29 of a conduit member 1. In embodiments, the first elbow coupling 66 surrounds and engages the first coupling 29, defining a continuous bore from the conduit member 1 through the elbow joint 64. The first elbow coupling 66 includes an arcuate stop portion 70 which fits into a complementary arcuate recess between the lugs 30 and an end wall 104 of the conduit member 1. The first elbow coupling 66 also includes an arcuate channel 72 which receives the lugs 30. When the elbow joint 66 is closed and the first elbow coupling engages the first coupling 29 of the conduit member, the lugs 30, arcuate channel 72 and arcuate stop portion cooperate with the annular configuration of the first coupling 29 to allow the elbow joint 66 to swivel about the couplings.

Figure 25:
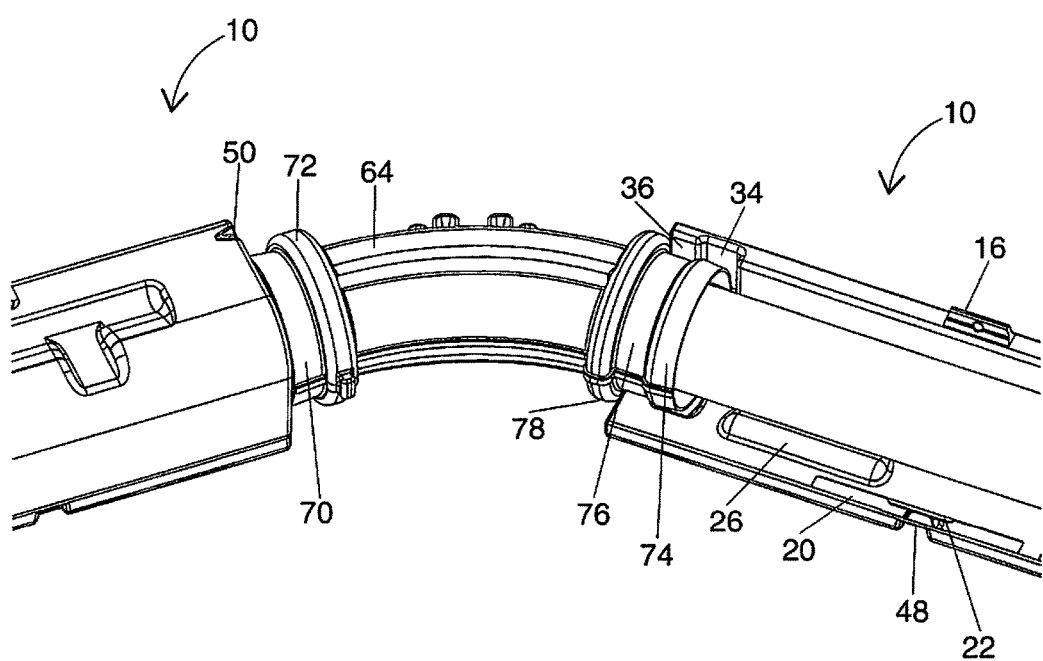
FIG. 25 is a partial perspective view of the conduit member, elbow joint and cable shown in FIG. 24, further illustrating the second end portion of the elbow joint nesting in a portion of a second coupling of the first shell of a second conduit member.

The second elbow coupling 68 is configured to engage the second coupling 33 of the conduit member 1. In embodiments, the second elbow coupling 68 is configured to fit within and be surrounded by the second coupling 33 when engaged, defining a continuous bore from the conduit member 1 through the elbow joint 64. The second elbow coupling 68 includes an annular end portion 74 of greater diameter than an adjacent intermediate coupling channel 76 and an annular stop 78 of greater diameter than either the annular end portion 74 or the intermediate coupling channel 76. As shown in FIG. 25, the annular end portion 74 is received by the depression 34 of the second coupling 33 and is seated therein. The stop 36 of the second coupling 33 helps maintain the annular end portion 74 in the depression 34 and provides resistance to disengagement of the couplings. Annular stop 78 abuts the stop 36 of the second coupling 33 and prevents movement of the conduit member 1 toward the central portion of the elbow joint 64. When the elbow joint 66 is closed and the second elbow coupling engages the second coupling 33 of the conduit member, the annular end portion 74, the intermediate coupling channel 76, and the annular stop cooperate with the annular configuration of the second coupling 33 to allow the elbow joint 66 to swivel about the couplings.

In embodiments, the elbow joint 64 is divided into a first elbow shell portion 100 and a complementary second elbow shell portion 102. Each elbow shell portion 101,102 includes a complementary portion of the first elbow coupling 66 at one end and a complementary portion of the second elbow coupling at the other end. When the divided shell portions 101, 102 are closed, the complementary portions of first elbow coupling 66 at one end combine to form the first elbow coupling 66, and the complementary portions of the second elbow coupling 68 at the other end combine to form the second elbow coupling 68.

In embodiments, a pivot 82 allows the first elbow shell portion 100 of the elbow joint 64 to close with the second elbow shell portion 102 of the elbow joint in clamshell fashion. See, e.g., FIGS. 19-22. In embodiments, the pivot 82 is a hinge which includes hinge knuckles 86 and a pin 88. In embodiments, two exterior hinge knuckles are mounted on the first elbow portion 100 and two interior hinge knuckles are mounted on the second elbow shell portion 102. Two oppositely disposed hinge pin stops 90 prevent the pin from shifting within the hinge. The configuration of the pivot is not critical and those skilled in the art will envision alternative pivots for incorporation into this aspect.

Figure 19:
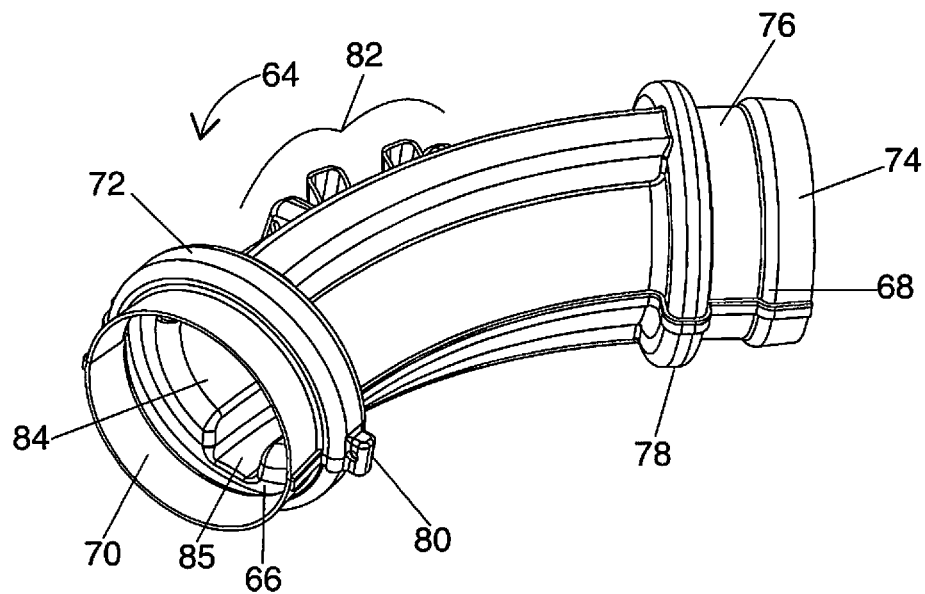
FIG. 19 is a perspective view of an elbow joint in accordance with the present disclosure.
Figure 20:
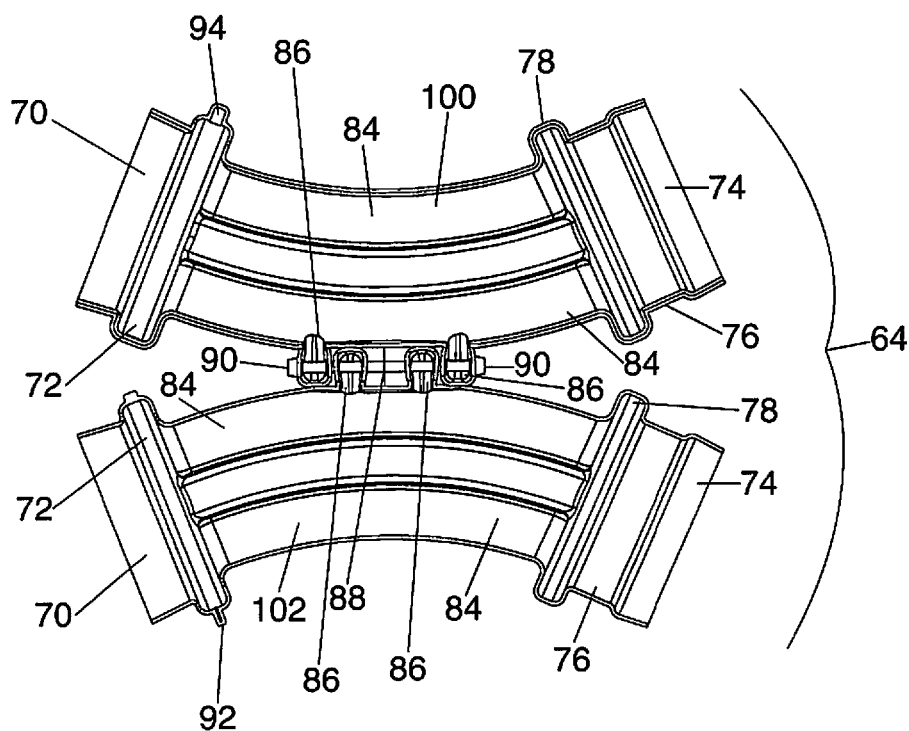
FIG. 20 is a top plan view of an open elbow joint illustrating the interior of the elbow joint and a hinge assembly in accordance with the present disclosure.
Figure 21:
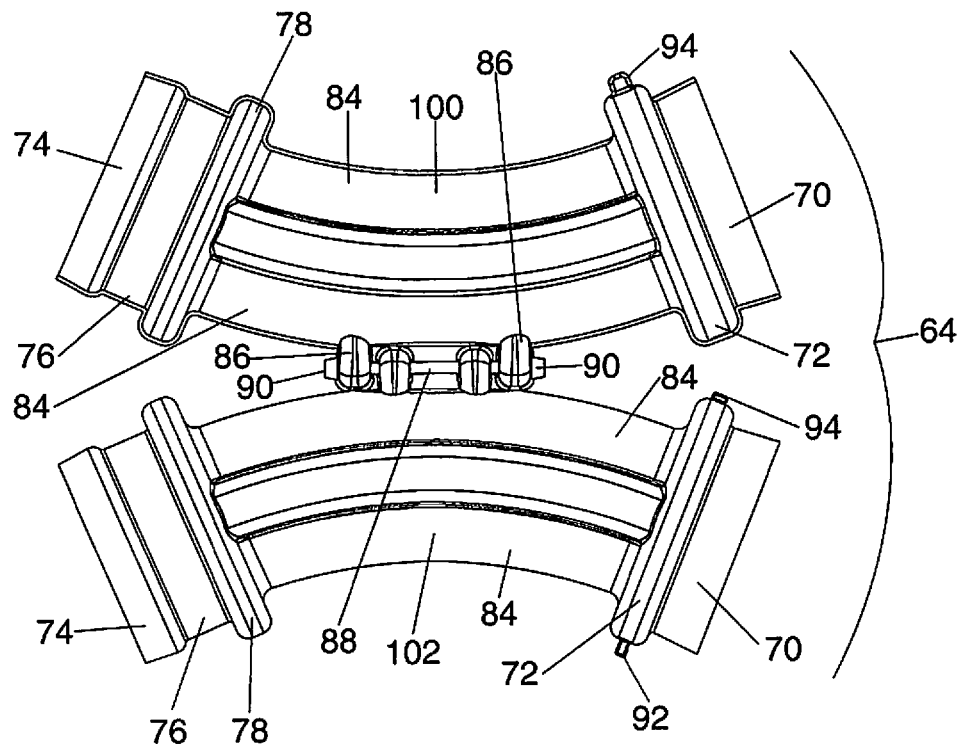
FIG. 21 is a bottom plan view of an open elbow joint illustrating the exterior of the elbow joint and a hinge assembly in accordance with the present disclosure.
Figure 22:
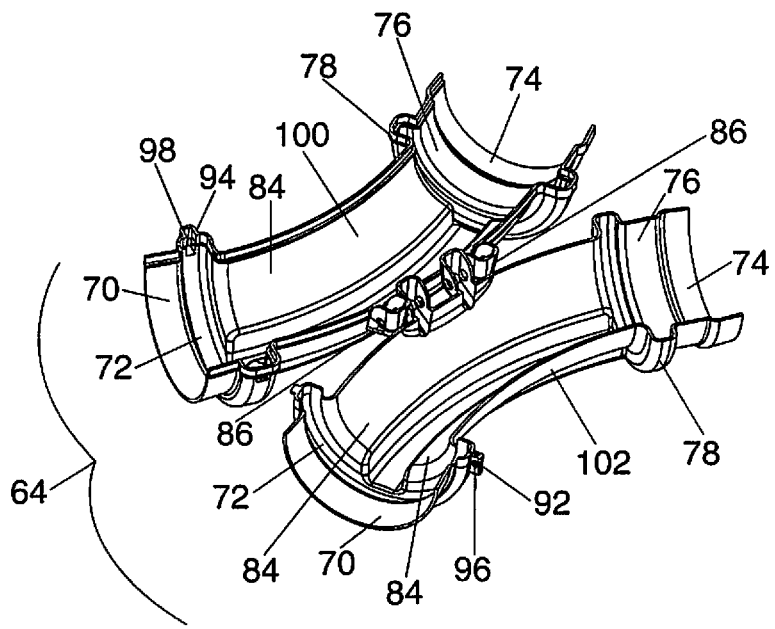
FIG. 22 is a perspective view of the interior an open elbow joint in accordance with the present disclosure.

In embodiments, as can be seen, e.g., from FIGS. 19 and 20 the elbow joint 64 includes an engagement structure 80 which prevents the first elbow shell portion 100 and second elbow shell portion 102 from separating when closed. In embodiments, a male portion 92 of the engagement structure is located on the second elbow shell portion 102 and a female portion 94 of the engagement structure is located on the first elbow shell portion 100. The male portion 92 includes a through hole 96 and the female portion 94 includes a complementary through hole 98 which align when the elbow joint 64 is closed. The aligned apertures are configured to receive an obstruction such as a pad-lock, plastic tie, bolt, rivet, and the like which prevents the elbow joint 64 from being opened. As also illustrated in FIGS. 19 and 20, cable support platforms 84 present raised areas to support the cable 58 over a channel 85. The channel 85 provides a sump area for water and other fluids thereby helping to prevent the cable from contacting the same.

Figure 23:
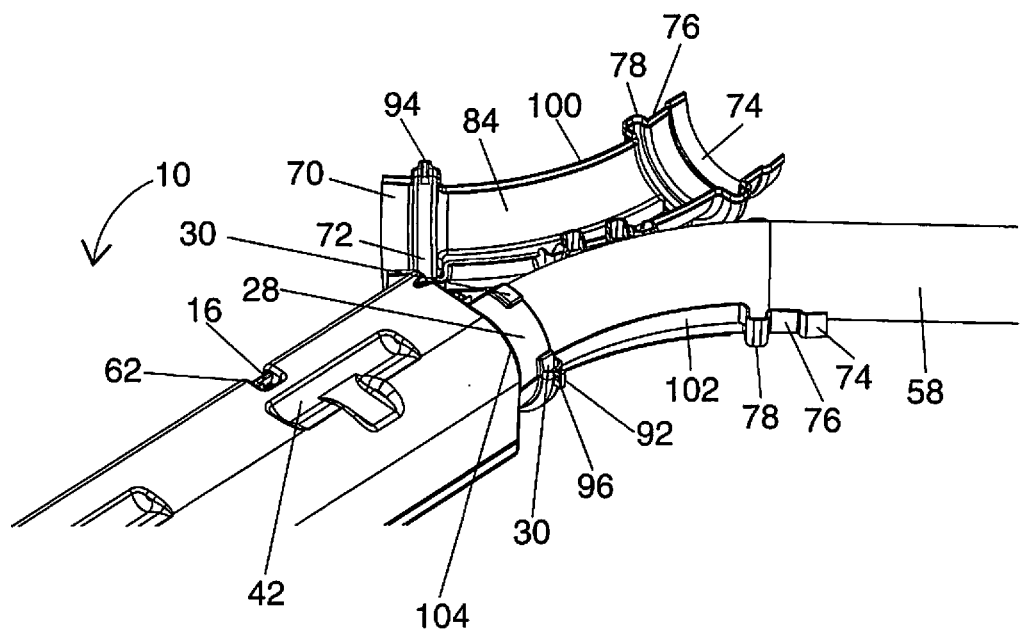
FIG. 23 is a partial perspective view of a conduit member and a first coupling along with a cable extending out the conduit member into an open elbow joint and on a first divided shell of the elbow joint, a first end portion of the divided shell engaging a portion of the first coupling of the conduit member.
Figure 24:
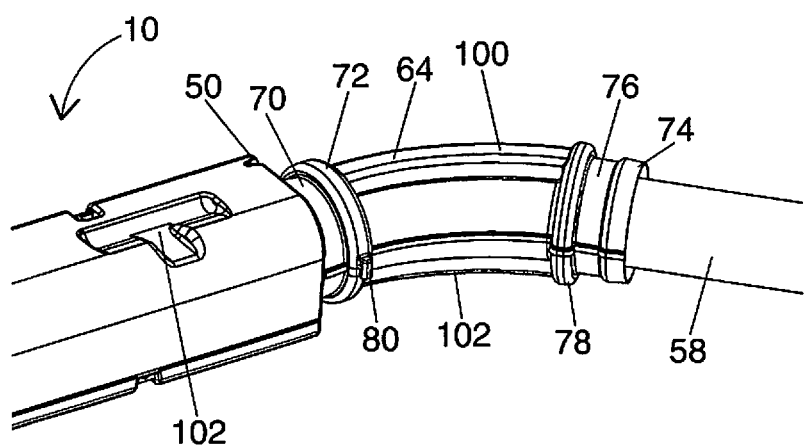
FIG. 24 is a partial perspective view of the conduit member shown in FIG. 23 with the second divided shell of the elbow joint closed over the portion of cable shown exposed in FIG. 23.

Referring to FIGS. 23 and 24, when coupling the elbow joint 64 to the first coupling 29 of the conduit member 1, the conduit member and any preceding conduit members, should be completely coupled to each other and interlocked over the cable 58. Either the first or second elbow shell portion 100 or 102 is placed under the cable 58 which is bent to accommodate the angle of the elbow joint 64 and the cable is seated in the elbow shell portion (elbow shell portion 102 is illustrated). The first coupling 29 of the conduit member is placed on the elbow shell portion 102 and seated on the portion of the first elbow coupling defined by elbow shell portion 102 and the first elbow shell portion 100 is closed over the second elbow portion to engage the first coupling 29 and cover the cable 58.

Figure 26:
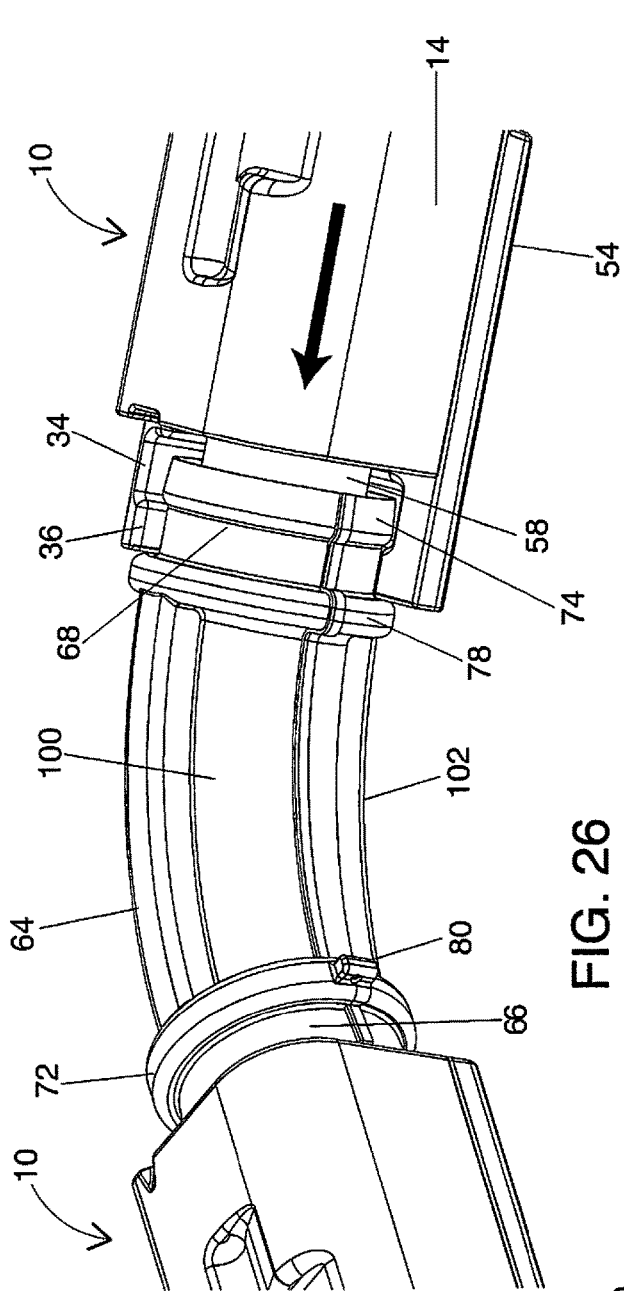
FIG. 26 is a perspective partial view of the conduit member, elbow, cable and first shell of the second conduit member shown in FIG. 25, illustrating placement of the second shell of the second conduit member over the first shell of the second conduit member, thus illustrating operation of the longitudinally sliding interlock, assembly of the second conduit member and coupling of the second conduit to the elbow joint, an arrow indicating direction of movement of the second shell of the second conduit in accordance with the present disclosure.

Referring to FIGS. 25 and 26, after closing the elbow joint 64, an initial longitudinally extending shell 10 may be placed under the elbow joint such that the second coupling portion 32 of the longitudinally extending shell receives the second elbow coupling 68. In practice, as many longitudinally extending shells as needed can then be placed longitudinally end to end, the cable 58 placed over them. Then another shell 10 is positioned over the initial shell 10 so that the interior wall faces toward the interior wall of the initial shell 10 and over the cable 58 and the longitudinally extending edges of the opposed shells are in alignment. The additional shell 10 is longitudinally offset in relation to the initial shell so that tabs, 16, 18 of the additional shell are aligned over the enlarged portions 21 of the slots 20 of the initial shell and then inserted therein. The additional shell 10 is then slid longitudinally along the slots 20 (see the direction of the arrow in FIG. 26) until the expanded portions 60 nest under the narrow portions 22 of the slots 20, thus preventing transverse removal of the tabs 16,18 from the slots 20. In this configuration, the ends of the initial shell and the additional shell cooperate to define the second coupling 33 which engages the second elbow coupling 68.

Figure 28:
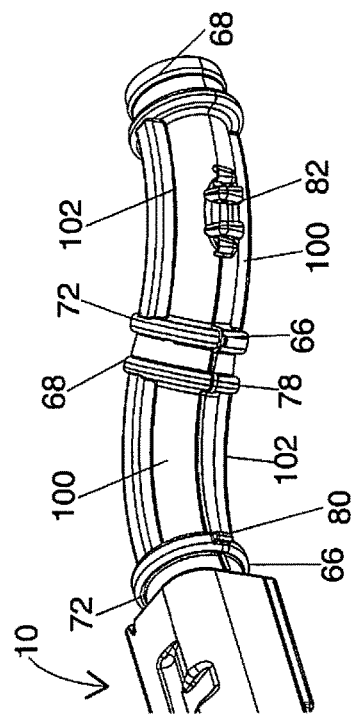
FIG. 28 is a perspective partial view of an end portion of a conduit member coupled to a first elbow joint to create a 45° turn, the first elbow joint being coupled to a second elbow joint which swivels to create a counter 45° turn in accordance with the present disclosure.
Figure 27:
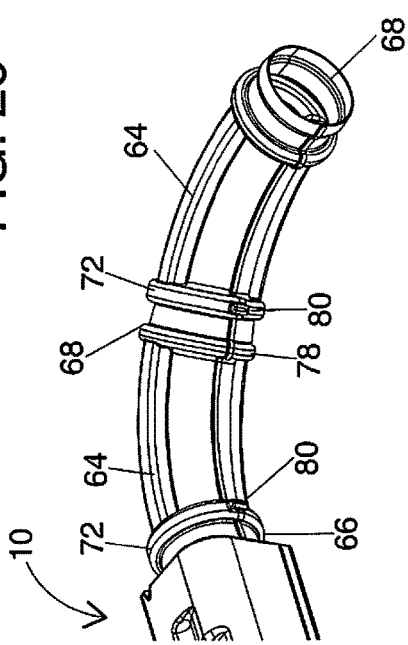
FIG. 27 is a perspective partial view of an end portion of a conduit member coupled to a first elbow joint, the first elbow joint being coupled to a second elbow joint to form a 90° turn in accordance with the present disclosure.

In embodiments, two elbow joints may be linked together to form a swiveling joint capable of 90° turns or zig zag configurations as illustrated, e.g., in FIGS. 27 and 28. For example, the first elbow coupling 66 of an elbow joint 64 is configured to engage the second elbow coupling 68 of another elbow joint. Accordingly, an elbow joint 64 is closed, and the second elbow coupling 68 from that elbow joint is placed on an elbow shell portion (either 100 or 102) of another elbow joint and seated on the portion of the first elbow coupling of the other elbow joint and the elbow shell portions are then closed over the second elbow coupling 68 to engage the second elbow coupling 68. In this manner, the complementary portions of the first elbow coupling 66 combine to form the first elbow coupling 66, thereby covering and engaging the second elbow coupling 68. The resulting assembly can swivel as shown in FIGS. 27 and 28.

Figure 29:
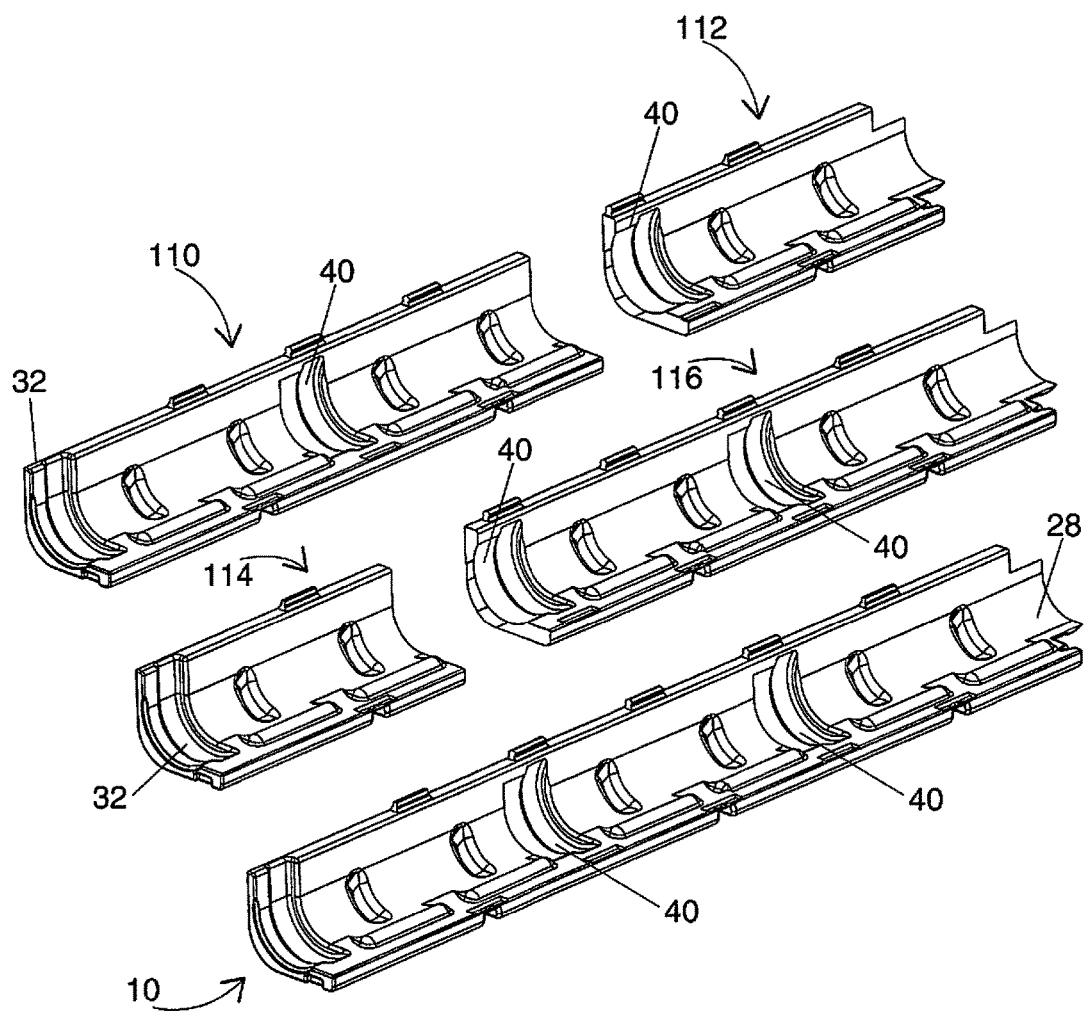
FIG. 29 illustrates, in perspective view, examples of subdivisions of a longitudinally extending shell of a conduit member, wherein interiorly disposed spare female coupling portions are exposed.

Referring to FIGS. 3, 5, 7, and 29, in embodiments, the interior wall 12 of the longitudinally extending shell 10 defines a portion of one or more spare second couplings 40 between the ends of the longitudinally extending shell 10. The portions 40 come together to define spare second couplings 41 when conduit members 1 are assembled. As illustrated in FIG. 29, the longitudinally extending shell 10 can be divided by cutting the shell 10 into segments, e.g., 110, 112, 114, and 116. Each division exposes the portion of a spare second coupling which allows on-site customization of the length of a longitudinally extending shell containing both first coupling portions 28 and spare second coupling portions 40 as in segments 112 and 116.

In embodiments, the modular conduit system includes a plurality of interengaging panels that cooperate to form a containment barrier which encloses an area. In embodiments, one or more of the interengaging panels include a conduit member receiving port for allowing a conduit member to pass through. The panels are pivotally connectable and capable of assuming fixed angular positions relative to one another via the pivot. The panels may be linked to form containment areas of varying sizes and shapes. The containment barrier can be utilized, e.g., to prevent unauthorized access to work areas where electrical cables, gas lines, fiber optic cables, water lines and the like would otherwise be exposed.

Figure 30:
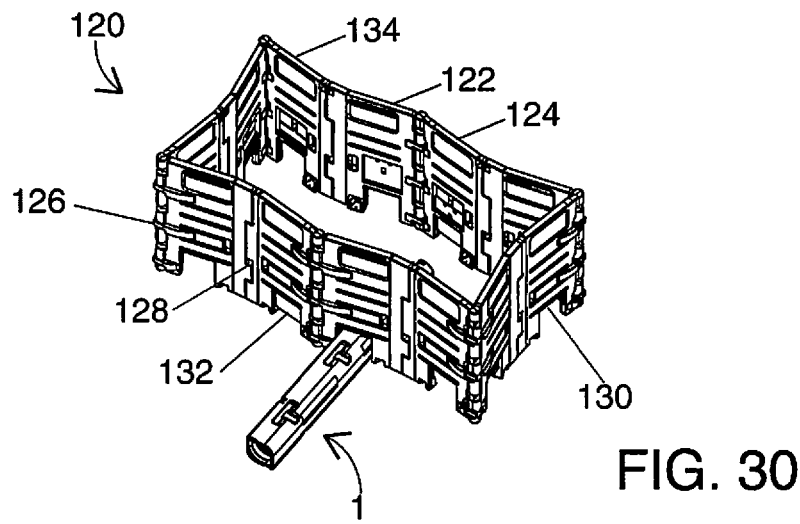
FIG. 30 illustrates, in perspective view, a rectangular containment barrier made of interengaging panels and a conduit member disposed therein in accordance with the present disclosure.
Figure 31:
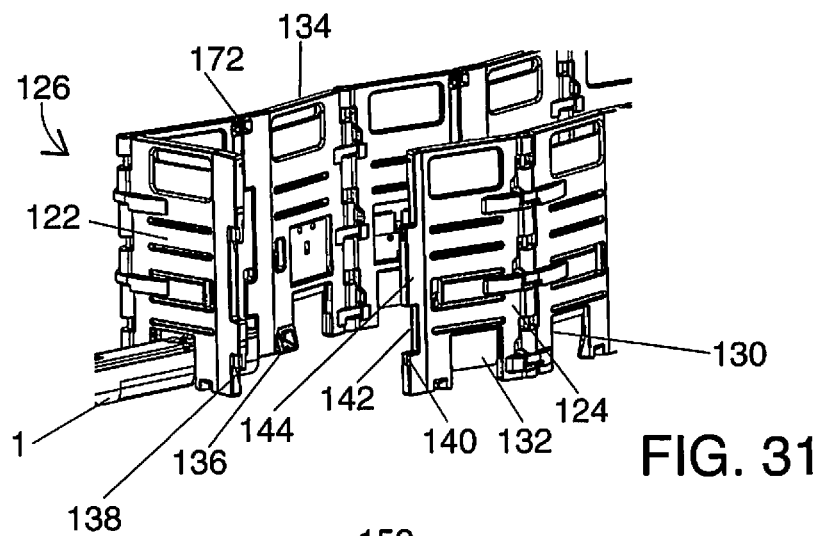
FIG. 31 illustrates, in perspective view, a portion of a containment barrier that has an open portion in accordance with the present disclosure.

A containment barrier 120 is illustrated, e.g., in FIGS. 30 and 31. A conduit member 1 is shown oriented through a port 130 into the containment area. The containment barrier 120 is made of a series of interengageable panels that link together. A first panel 122 has first and second opposing sides which are configured to mate with complementary first and second opposing sides of a second panel 124. A pivot array 126 between the panels is formed from one or more first engagement structures disposed on the first side of a first panel 122 that mate with one or more complementary second engagement structures disposed on a first side of the second panel 124. A panel interlock 128 is formed between the second side of the first panel 122 and the second side of the second panel 124. Ports 130 for receiving conduit members 1 are shown on each of the panels 122, 124. Access through the ports 130 can be restricted by doors 132. In embodiments, one or more panels may have handles 134 which facilitate manipulation and/or transport of the panels. In embodiments, one or more anchoring flanges 136 are located at the bottom of the panels which can be used to stabilize the panels. Nails, bolts, stakes and the like can be driven through the anchoring flanges 136 and into the surface on which the panels are supported, e.g., a road or sidewalk, to securely mount the panels on the surface.

The panel interlock 128, as can be seen from FIGS. 30, 31, 35, 36, 40 and 41, includes one or more sets of complementary recesses 142 and protuberances 144 that engage and help stabilize the interlock 128. In embodiments, a sliding interlock structure results from the combination of one or more mortise and tenon joints. For example, one or more flanges 138 on the second side of the first panel and one or more complementary flange receptacles 140 on the second side of the second panel 124. In embodiments, the flanges 138 include an expanded portion 139 which is received in a complementary enlarged portion 141 of the flange. To assemble the panel interlock 128, panel 122, the flange 138 is aligned over the flange receptacle 140 and pushed down into the receptacle 140 until the protuberance (s) of panel 122 contact the protuberance(s) of panel 124, thus forming the panel interlock 128.

Figure 32:
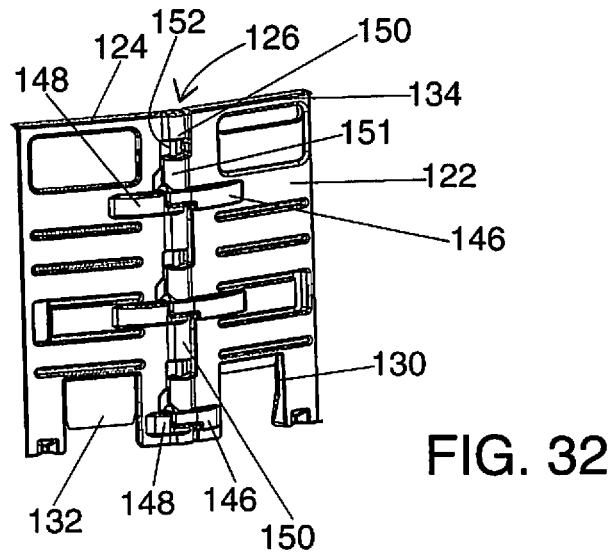
FIG. 32 illustrates, in perspective view, a portion of first and second engagement panels in accordance with the present disclosure.
Figure 33:
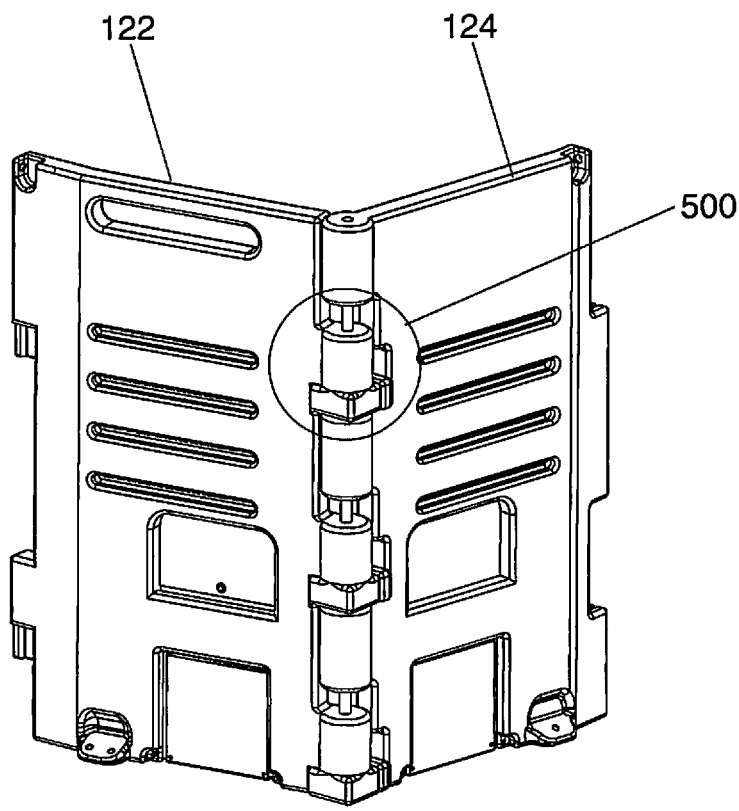
FIG. 33 illustrates, in perspective view, a pivot array in connection with first and second engagement panels in accordance with the present disclosure.
Figure 34:
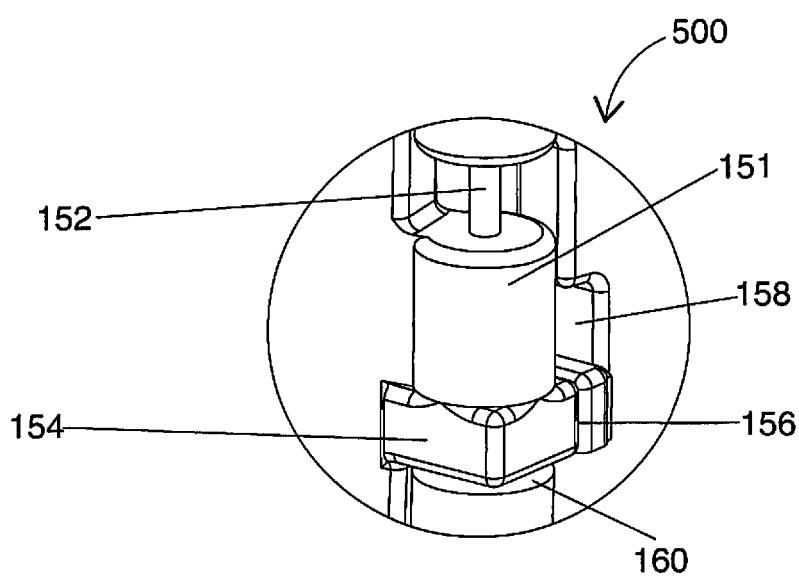
FIG. 34 is an enlargement of the highlighted portion of FIG. 33, illustrating a pivoting array unit shown in FIG. 33 in accordance with the present disclosure.
Figure 35:
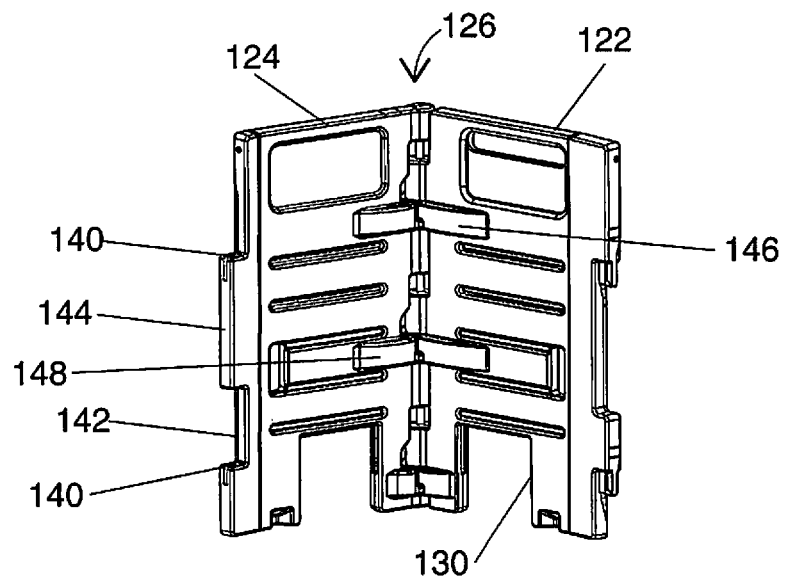
FIG. 35 illustrates, in perspective view, a portion of the first panel and the second panel oriented at a right angle in accordance with the present disclosure.
Figure 36:
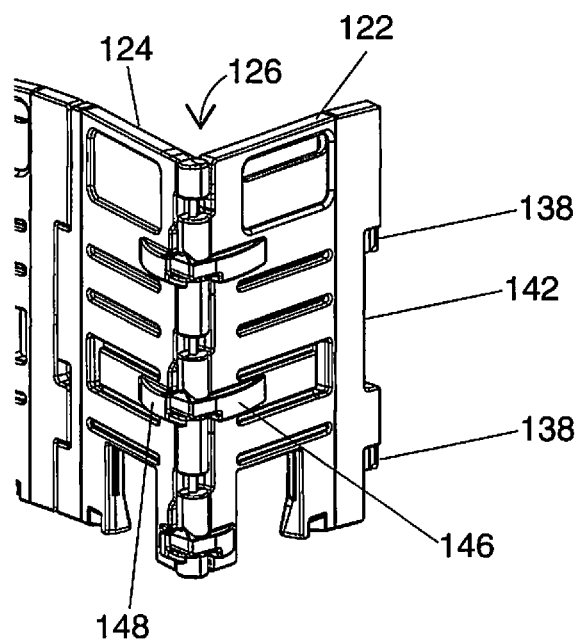
FIG. 36 illustrates, in perspective view, the first panel and the second panel oriented at a reverse right angle in accordance with the present disclosure.
Figure 39:
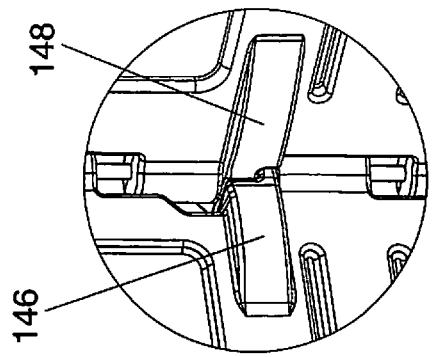
FIG. 39 illustrates, in perspective view, a portion of a pivoting array unit as shown in FIG. 34 oriented at a reverse 90° angle in accordance with the present disclosure.
Figure 38:
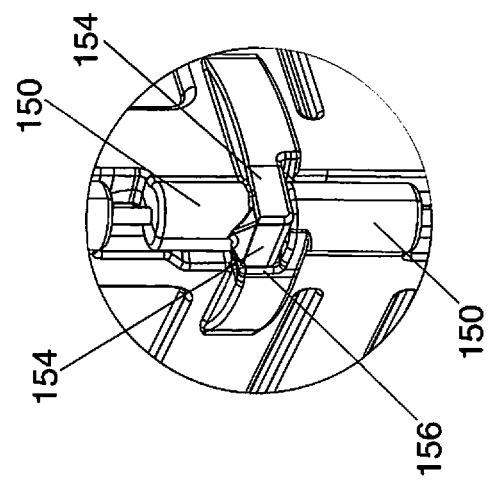
FIG. 38 illustrates, in perspective view, a portion of a pivoting array unit as shown in FIG. 34 oriented at a 90° angle in accordance with the present disclosure.
Figure 37:
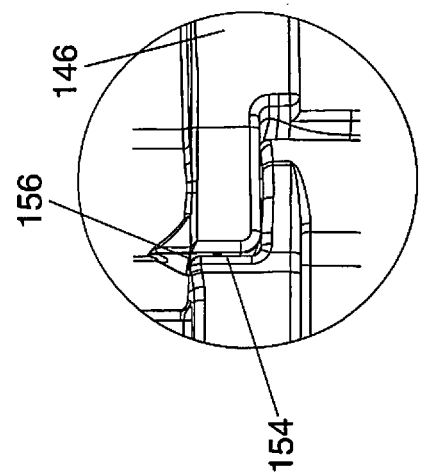
FIG. 37 illustrates, in perspective view, a portion of a pivoting array unit as shown in FIG. 34 oriented at a 180° angle in accordance with the present disclosure.
Figure 40:
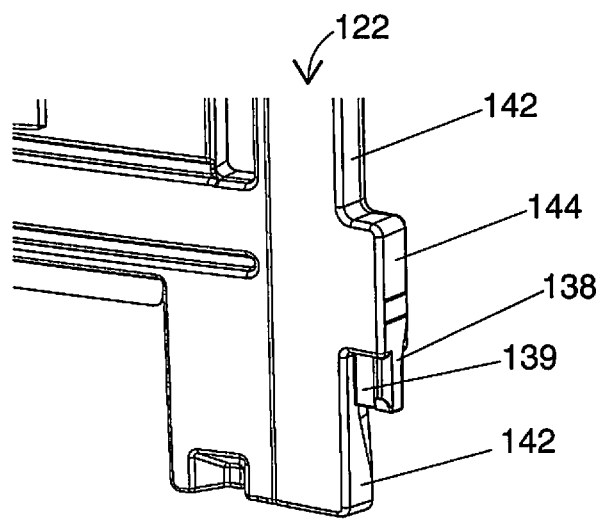
FIG. 40 illustrates, in perspective view, a portion of a panel interlock in accordance with the present disclosure.
Figure 41:
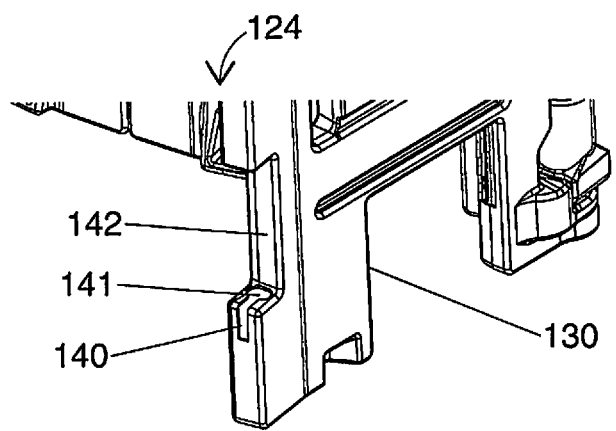
FIG. 41 illustrates, in perspective view, a portion of a panel interlock complementary to the portion of the panel interlock shown in FIG. 40 in accordance with the present disclosure.

The pivot array 126 is illustrated, e.g., in FIGS. 30 through 39. The pivot array 126 includes 1 or more pivot structures that are pivotable about a pivot member between a plurality of positions. In embodiments, the second panel includes pivot knuckles 150 and the first panel includes complementary pivot stop knuckles 151 which intermesh. A pin 152 extends through the knuckles 150, 151 and provides an axis of rotation. The pivot stop knuckles 151 include a pivot knuckle stop surface member 154. The pivot knuckle stop surface member 154 registers with a knuckle stop engaging member 156 on panel 124 to prevent rotation of the pivot array and lock a position of the pivot array 126 and prevents the panels 122, 124 from rotating relative to each other. To disengage the lock and rotate the panels 122, 124, panel 122 is lifted so that the pivot knuckle stop surface members 154 clear the knuckle stop engaging members 156 and align with the knuckle stop receiving recesses 158 which have enough clearance to allow the pivot array 126 and hence, the panels 122, 124 to freely rotate. The pivot array 126 may be fixed into position by rotating the pivot stop knuckles 151 until they drop down onto a knuckle stop shelf 160 and engage the respective knuckle stop engaging members 156. In embodiments, such as those illustrated in FIGS. 30 through 39, the pivot stop knuckles 151 provide orthogonal fixed positions, i.e., a choice between the panels oriented at right angles to each other or at 180°. The rectangular nature of the pivot knuckle stop 154 determines the range. Thus, a range from 90° to 180° to −90° is provided. FIGS. 32 and 35 through 39 illustrate the orthogonal range. FIGS. 32 and 37 illustrate a 180° angle. FIGS. 35, 36, 38 and 39 illustrate right angles. It is contemplated that the pivot knuckle stop surface member 154 may also be generally polygonal to allow a greater range of angles, such as pentagonal, hexagonal, heptagonal, etc. In embodiments, ribs 146, 148 can be employed to strengthen the pivot array 126.

In embodiments, the face of the panels may be disposed at an angle, e.g., 2° to 10°, or anywhere in between, relative to the position determined by pivot array. In this manner, when the panels 122, 124 are linked together, a zig-zag pattern is created as illustrated in FIG. 30. The zig-zap pattern provides a footprint with greater stability than a straight footprint.

Figure 42:
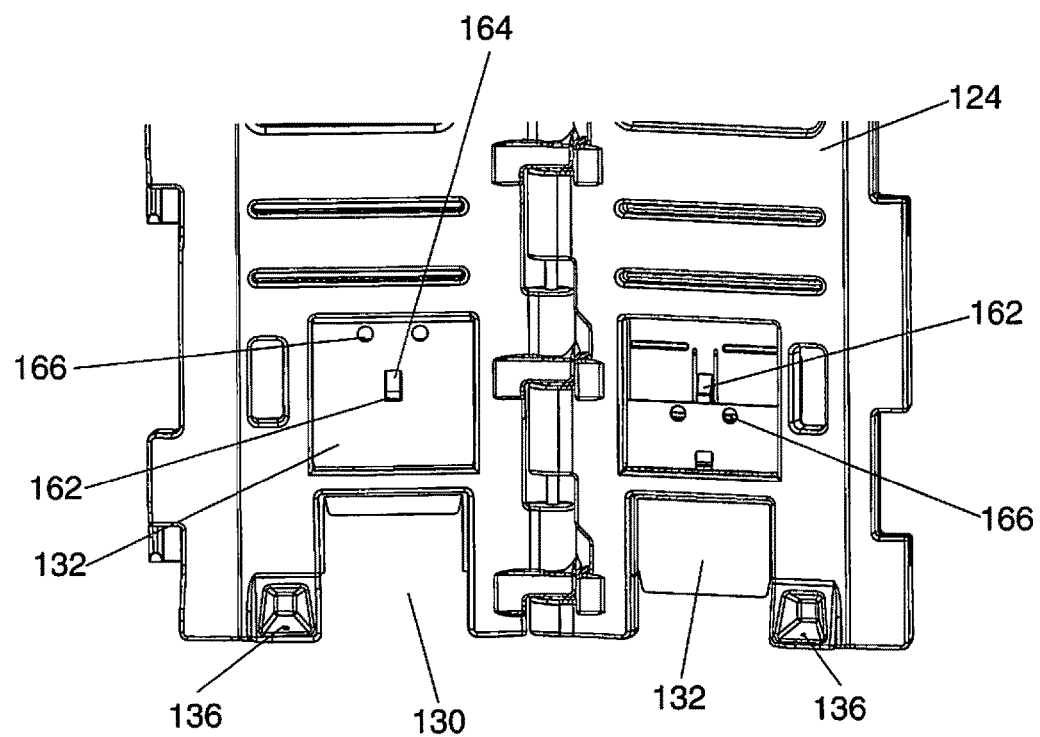
FIG. 42 illustrates, in perspective view, a portion of first and second panels, further illustrating two ports and doors for receiving a conduit member in accordance with the present disclosure.
Figure 43:
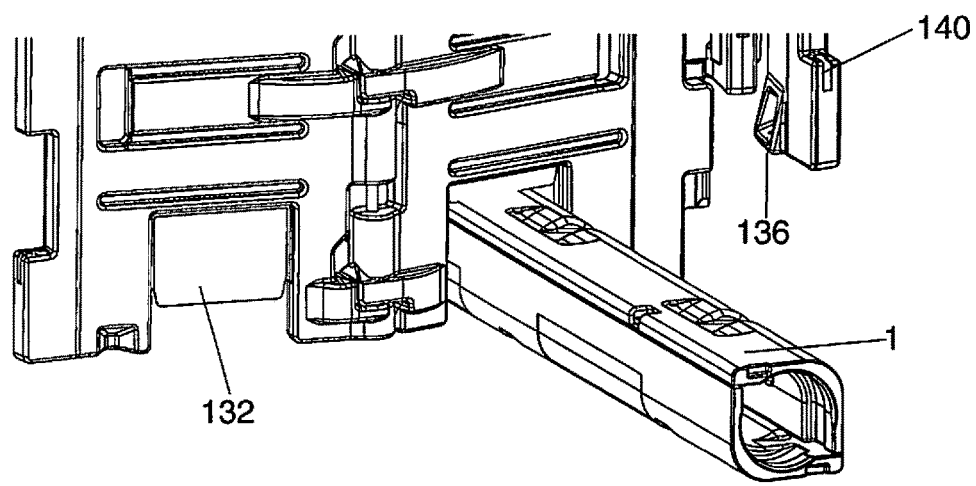
FIG. 43 illustrates, in perspective view, a portion of first and second panels, further illustrating a partially closed port and door for receiving a conduit member and a conduit member passing through a port in accordance with the present disclosure.
Figure 44:
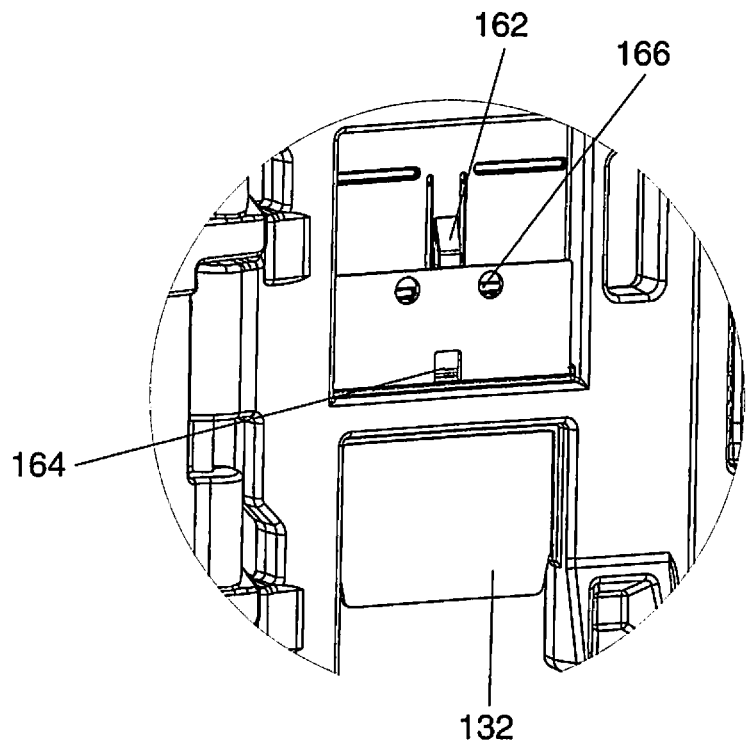
FIG. 44 illustrates, in perspective view, an enlargement of the port door, further illustrating a detent and notch for maintaining position of the door in accordance with the present disclosure.
Figure 45:
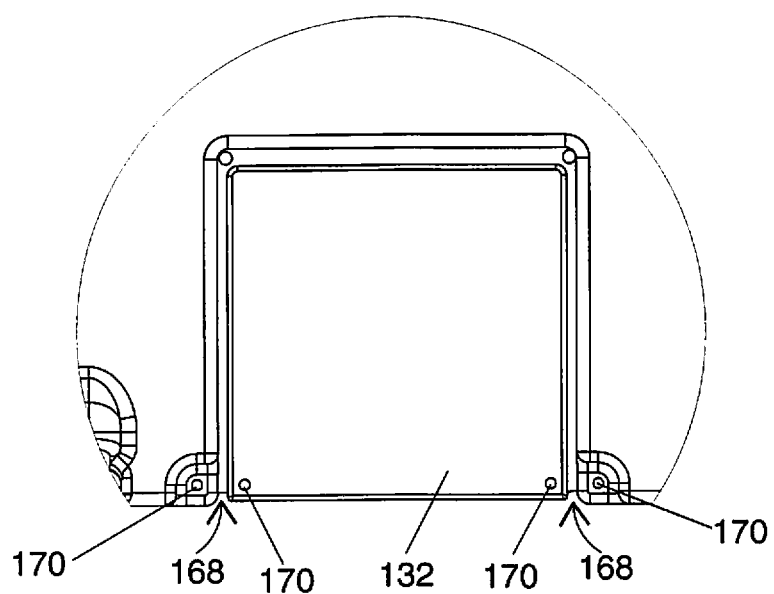
FIG. 45 illustrates, in perspective view, a closed port door and a lock receptacle for securing the door in a closed position accordance with the present disclosure.

The ports 130 and doors 132 provide access to route conduit members 1 in or out of the containment barriers 120. In embodiments, as illustrated in FIGS. 43 through 45, the ports 132 are located at the bottom of the panels 122, 124. Doors 132 are provided to prevent unauthorized access to the containment area. In embodiments, the door may function as a flap on a hinge or it may slide up and down in guillotine fashion. As illustrated in FIGS. 42 and 44, the door 132 may be fixed in an open position using, e.g., a detent 162 which registers with a notch 164. To release the door, the detent is depressed and the door 132 will slide freely. In embodiments grips 166 are provided as finger holds to assist on sliding the door 132 up and down. As shown in FIG. 45, the door and panels 122, 124 may include a lock receptacle 168 to insure that the doors remain closed. Apertures 170 may be utilized to receive ties, padlocks and the like, which prevent the doors from opening.

In embodiments, the panels 122, 124 may be equipped with lock receptacles 172 that allow padlocks, ties and the like to secure the panels and prevent disengagement of the panel interlock 128.

In embodiments, the panels 122, 124 are hollow and are filled with a fluid for ballast. Fluids, e.g., can be liquids or particulates such as water or sand. A fill port can be located, e.g., on an upper portion of the panels 122.124. A drain plug can be located on a lower portion of the panels 122, 124.

Components of the modular conduit system, e.g., conduit members 1, longitudinally extending shells 10, elbow joints 64, interengaging panels 122,124 may be fabricated with known materials such as plastics and light weight metals. Materials used to fabricate components of the modular conduit system should be durable and strong to withstand impacts and maintain these characteristics in hot and cold conditions. Suitable plastic materials include polyesters, olefins and amides. Examples include high molecular weight polyethylene, polycarbonates, polyamides, and terephthalates. Carbon fiber materials and fiberglass may be suitable as well. Those skilled in the art are familiar with suitable materials usable herein. Fabrication techniques such thermoforming and others are well known in the art such as twin sheet vacuum forming may be utilized in the manufacture of components of the modular conduit system herein.

It will be understood that various modifications may be made to the embodiments disclosed herein. Therefore, the above description should not be construed as limiting, but merely as exemplifications of various embodiments. Those skilled in the art will envision other modifications within the scope and spirit of the claims appended hereto.

What is claimed is:

1. A modular conduit system comprising:
   at least one longitudinally extending shell component including an interior wall and an exterior wall,
   a first longitudinally extending edge,
   a second opposed longitudinally extending edge,
   the interior wall defining an arcuate portion between the first longitudinally extending edge and the second longitudinally extending edge,
   at least one engagement tab located adjacent the first longitudinal edge,
   at least one engagement slot located adjacent the second longitudinally extending edge, the engagement slot having enlarged portions disposed at opposite ends of the slot and a narrow portion separating the enlarged portions, the enlarged portion configured to receive an engagement tab from another longitudinally extending shell, the narrow portion configured to interfere with removal of the tab in a direction transverse to the slot.

2. The modular conduit system according to claim 1 wherein a plurality of engagement tabs are located in spaced relation adjacently along the first longitudinal edge and a plurality of engagement slots are located in spaced relation adjacently along the second longitudinal edge.

3. The modular conduit system according to claim 1 wherein the longitudinally extending shell has a first end portion and a second end portion, the first end portion including at least a portion of a first coupling and the second end portion including at least a portion of a second coupling, the first coupling and second coupling being complementary and configured to engage each other by a friction fit.

4. The modular conduit system according to claim 3 the first coupling includes a cantilever extending longitudinally from the first end, the cantilever having a lug disposed thereon, the second coupling being dimensioned and configured to receive the cantilever and the lug, the lug dimensioned and configured to mate with a depression formed on the second coupling.

5. The modular conduit system according to claim 3 wherein the interior wall defines at least one spare second coupling located between the first and second end portions.

6. The modular conduit system according to claim 1 wherein the interior wall defines at least one retainer dimensioned and configured to maintain a cable in position along the arcuate portion.

7. The modular conduit system according to claim 1 wherein the exterior wall defines an L-shaped cross-section.

8. The modular conduit system according to claim 1 wherein a nesting indent is formed on the exterior wall, the nesting indent dimensioned and configured to receive a retainer disposed on the interior wall, wherein the interior wall is complementary to an interior wall of another longitudinally extending shell, the other longitudinally extending shell having a retainer on an interior wall, thereby allowing the longitudinally extending shell component to fit over and against the other longitudinally extending shell and form a stack, whereby the nesting indent of the longitudinally extending shell component and the retainer of the other longitudinally extending shell cooperate to stabilize the stack.

9. A modular conduit system comprising:
   first and second longitudinally divided shells engageable to form a conduit member defining a longitudinal bore, the first shell having an interior wall and an exterior wall, the second shell having an interior wall and an exterior wall, the first shell including a first engagement structure and the second shell including a second engagement structure wherein the first and second engagement structures are configured to form a longitudinally sliding interlock which interferes with separation of the longitudinally divided shells of the conduit member,
   wherein the first engagement structure is a tab located adjacent a longitudinal edge of the first longitudinally divided shell, the tab having an expanded portion, and the second engagement structure defines a slot having an enlarged portion and a narrow portion, wherein the expanded portion of the tab has a dimension smaller than the enlarged portion of the slot and the expanded portion of the tab has a dimension larger than the narrow portion of the slot such that the tab is receivable in the enlarged portion of the slot and movable through the slot into the narrow portion of the slot to engage the narrow portion of the slot and secure the first shell to the second shell, wherein the second engagement structure defines a slot having enlarged portions disposed at opposite ends of the slot which are separated by the narrow portion.

10. The modular conduit system according to claim 9 wherein the first shell has a plurality of first engagement structures located adjacent the longitudinal edge and the second shell defines a plurality of second engagement structures which are configured to form a plurality of discrete sliding interlocks.

11. The modular conduit system according to claim 9 wherein the first shell includes both the first engagement structure and the second engagement structure and the second shell includes both the first engagement structure and the second engagement structure.

12. The modular conduit system according to claim 9 wherein the slot is disposed on the interior wall of the second shell such that when the tab is in the narrow portion of the slot, a portion of the tab extends through an aperture located on the exterior wall of the second shell, wherein the portion of the tab which extends through the aperture located on the exterior wall of the second shell has an aperture configured to receive an obstruction, thereby preventing longitudinal movement of the first shell relative to the second shell when the shells are engaged to form the conduit member.

13. The modular conduit system according to claim 9 wherein the interior wall and the exterior wall are separated by a cavity thereby forming a double walled construct, wherein the interior wall defines at least one support member extending from the interior wall into the cavity, the support member dimensioned and configured to buttress the exterior wall from within the cavity.

14. The modular conduit system according to claim 9 wherein the interior wall defines an arcuate portion extending longitudinally along the length of the first shell and the exterior wall defines an L-shaped cross-section.

15. The modular conduit system according to claim 14 wherein the interior wall defines at least one retainer dimensioned and configured to maintain a cable in position adjacent the arcuate portion.

16. The modular conduit system according to claim 9 wherein the conduit member has a first end portion and a second end portion, the first end portion including a first coupling and the second end portion including a second coupling.

17. The modular conduit system according to claim 16 wherein the first and second couplings are dimensioned and configured to couple together by a friction fit.

18. The modular conduit system according to claim 16 wherein the first coupling includes a cantilever extending longitudinally from the first end, the cantilever having a lug disposed thereon, wherein the second coupling is dimensioned and configured to receive at least a portion of the cantilever and the lug, the lug dimensioned and configured to mate with a depression defined in the second coupling.

19. The modular conduit system according to claim 16 wherein the first shell defines a first portion of the first coupling and the second shell defines a second portion of the first coupling.

20. The modular conduit system according to claim 16 wherein the first shell defines a first portion of the second coupling and the second shell defines a second portion of the second coupling.

21. The modular conduit system according to claim 9 wherein a nesting indent is formed on the exterior wall, the nesting indent dimensioned and configured to receive a retainer disposed on the interior wall and the interior wall of the first shell is complementary to the exterior wall of the second shell, thereby allowing the first shell to fit over and against the second shell and form a stack, whereby the nesting indent and the retainer cooperate to stabilize the stack.

22. The modular conduit system according to claim 9 wherein the conduit member defines a contiguous interior wall formed from the interior wall of the first shell and the second shell, the contiguous inner wall defining a spare second coupling located between the first and second end portions, wherein the first shell defines a first portion of the spare second coupling and the second shell defines a second portion of the spare second coupling.

23. The modular conduit system according to claim 9 further comprising a first elbow joint dimensioned and configured to couple a first conduit member to a second conduit member.

24. The modular conduit system according to claim 23 wherein the first elbow joint is swivelably coupled to the first conduit member.

25. The modular conduit system according to claim 23 further comprising a second elbow joint dimensioned and configured to couple to the first elbow joint.

26. The modular conduit system according to claim 25 wherein the second elbow joint is swivelably coupled to the first elbow joint.

27. The modular conduit system according to claim 23 wherein the first elbow joint includes two divided shells engageable to form an elbow conduit member defining a bore from a first end portion of the first elbow joint through a second end portion of the elbow joint.

28. The modular conduit system according to claim 27 wherein the two divided shells are pivotally connected to one another.

29. The modular conduit system according to claim 27 wherein the conduit member has a first end portion and a second end portion, the first end portion including a first coupling and the second end portion including a second coupling, the first end portion of the first elbow joint being dimensioned and configured to cover and swivelably engage the first coupling of the conduit member when the two divided shells are closed thereby preventing disassembly of the conduit member and the first elbow joint.

30. The modular conduit system according to claim 27 wherein the conduit member has a first end portion and a second end portion, the first end portion including a first coupling and the second end portion including a second coupling, wherein the second end portion of the first elbow joint is dimensioned and configured to fit within and be swivelably engaged by the second coupling of the conduit member when the two divided shells are closed thereby preventing disassembly of the conduit member and the first elbow joint.

31. The modular conduit system according to claim 25 wherein the first elbow joint includes two divided shells engageable to form an elbow conduit member defining an bore from a first end portion of the first elbow joint through a second end portion of the first elbow joint, and the second elbow joint includes two divided shells engageable to form a second elbow conduit member defining an bore from a first end portion of the second elbow joint through a second end portion of the second elbow joint, the first end portion of the first elbow joint including a first coupling and the second end portion of the first elbow joint including a second coupling, the first end portion of the second elbow joint including a first coupling and the second end portion of the second elbow joint including a second coupling, wherein the first end portion of the second elbow joint is dimensioned and configured to engage the second coupling of the conduit member when the two divided shells of the second elbow joint are closed.

32. The modular conduit system according to claim 31 wherein the first end portion of the second elbow joint is dimensioned and configured to cover and swivelably engage the second coupling of the first elbow joint when the two divided shells of the second elbow joint are closed thereby preventing disassembly of the first elbow joint and the second elbow joint.

33. The modular conduit system according to claim 16 wherein a first conduit member is coupled to a second conduit member, the first coupling of the first conduit member being coupled to the second coupling of the second conduit member.

34. The modular conduit system according to claim 27 wherein the elbow joint includes a interlock that prevents separation of the divided shells.

35. The modular conduit system according to claim 9 further comprising a plurality of interengaging panels that cooperate to form an enclosed containment area, one or more of the panels including a conduit member receiving port dimensioned and configured to allow the conduit member to pass through the panels.

36. The modular conduit system according to claim 35 wherein a first panel has a top portion, a bottom portion, a first side portion and an opposed second side portion, a second panel has a top portion, a bottom portion, a first side portion and an opposed second side portion wherein the first side portion of the first panel includes a first engagement structure and second side portion of the second panel includes a second engagement structure wherein the first and second engagement structures are configured to define a pivot which provides one or more fixed relative panel positions.

37. The modular conduit system according to claim 36 wherein the first engagement structure includes a stop which is complimentary to a stop receiving surface of the second engagement structure of the second panel, the stop of the first engagement structure and stop receiving surface of the second engagement structure cooperating to define the one or more fixed relative panel positions.

38. The modular conduit system according to claim 36 wherein the second side portion of the first panel includes a second panel engagement structure and the first side portion of the second panel includes a first panel engagement structure wherein the first panel and second panel engagement structures are configured to form a vertically sliding interlock for linking adjacent panels together.

39. The modular conduit system according to claim 36 wherein the second side portion of the first panel includes a first lock receptor and the first side portion of the second panel includes a second lock receptor, wherein the first lock receptor and second lock receptor are configured to receive a lock and cooperate to prevent disassembly of linked adjacent panels.

40. The modular conduit system according to claim 35 wherein the panels include a closure for the port.

41. The modular conduit system according to claim 40 wherein the closure is selected from a pivoting door, slidable door and a door that is pivotable and slidable.

42. The modular conduit system according to claim 41 wherein the closure is lockable.

43. The modular conduit system according to claim 35 wherein one or more of the panels has a top portion, a bottom portion, a first side portion and an opposed second side portion, the bottom portion including an anchoring flange.

44. The modular conduit system according to claim 35 wherein one or more of the panels is hollow and configured to be filled with a fluid material for ballast.

45. The modular conduit system according to claim 35 wherein the plurality of interengaging panels cooperate to form a wall having a zig-zag configuration.

46. A modular conduit system comprising:
first and second longitudinally divided shells engageable to form a conduit member defining a longitudinal bore, the first shell having an interior wall and an exterior wall, the second shell having an interior wall and an exterior wall, the first shell including a plurality of tabs in spaced relation located adjacent a longitudinal edge of the first longitudinally divided shell, each of the tabs having an expanded portion, and the second shell including a plurality of slots in spaced relation and complementary to the tabs, each slot having an enlarged portion and a narrow portion, wherein the expanded portion of each tab has a dimension smaller than the enlarged portion of each complementary slot and the expanded portion of each tab has a dimension larger than the narrow portion of each slot such that each tab is receivable in the enlarged portion of each complementary slot and movable through each slot into the narrow portion of each slot to engage the narrow portion of each slot and secure the first shell to the second shell,
wherein the interior wall and the exterior wall of at least the first shell are separated by a cavity thereby forming a double walled construct, the interior wall defining one or more support members extending from the interior wall into the cavity, the support members dimensioned and configured to buttress the exterior wall from within the cavity,
wherein the interior wall of at least the first shell defines an arcuate portion extending longitudinally along the length of the wall and the exterior wall of the at least the first shell defines an L-shaped cross-section, the interior wall defining at least one retainer configured and dimensioned to maintain a cable in position adjacent the arcuate portion,
wherein the conduit member has a first end portion including a first coupling including a cantilever having a lug disposed thereon, and a second end portion including a second coupling dimensioned and configured to receive at least a portion of the cantilever and lug, the lug dimensioned and configured to mate with a depression defined in the second coupling,
wherein the conduit member defines a contiguous interior wall formed from the interior wall of the first shell and interior wall of the second shell, the contiguous inner wall defining a spare second coupling located between the first and second end portions, wherein the first shell defines a first portion of the spare second coupling and the second shell defines a second portion of the spare second coupling.

47. A modular conduit system comprising:
at least one longitudinally extending shell component including an interior wall and an exterior wall,
a first longitudinally extending edge,
a second opposed longitudinally extending edge, the interior wall defining an arcuate portion between the first longitudinally extending edge and the second longitudinally extending edge, at least one engagement tab located adjacent the first longitudinal edge, at least one engagement slot located adjacent the second longitudinally extending edge, the engagement slot having an enlarged and a narrow portion, the enlarged portion configured to receive an engagement tab from another longitudinally extending shell, the narrow portion configured to interfere with removal of the tab in a direction transverse to the slot, wherein the longitudinally extending shell has a first end portion and a second end portion, the first end portion including at least a portion of a first coupling and the second end portion including at least a portion of a second coupling, the first coupling and second coupling being complementary and configured to engage each other by a friction fit, and wherein the interior wall defines at least one spare second coupling located between the first and second end portions.

48. A modular conduit system comprising:

at least one longitudinally extending shell component including an interior wall and an exterior wall, a first longitudinally extending edge, a second opposed longitudinally extending edge, the interior wall defining an arcuate portion between the first longitudinally extending edge and the second longitudinally extending edge, at least one engagement tab located adjacent the first longitudinal edge, at least one engagement slot located adjacent the second longitudinally extending edge, the engagement slot having an enlarged and a narrow portion, the enlarged portion configured to receive an engagement tab from another longitudinally extending shell, the narrow portion configured to interfere with removal of the tab in a direction transverse to the slot, wherein a nesting indent is formed on the exterior wall, the nesting indent dimensioned and configured to receive a retainer disposed on the interior wall, wherein the interior wall is complementary to an interior wall of another longitudinally extending shell, the other longitudinally extending shell having a retainer on an interior wall, thereby allowing the longitudinally extending shell component to fit over and against the other longitudinally extending shell and form a stack, whereby the nesting indent of the longitudinally extending shell component and the retainer of the other longitudinally extending shell cooperate to stabilize the stack.

49. A modular conduit system comprising:

first and second longitudinally divided shells engageable to form a conduit member defining a longitudinal bore, the first shell having an interior wall and an exterior wall, the second shell having an interior wall and an exterior wall, the first shell including a first engagement structure and the second shell including a second engagement structure wherein the first and second engagement structures are configured to form a longitudinally sliding interlock which interferes with separation of the longitudinally divided shells of the conduit member, wherein a nesting indent is formed on the exterior wall, the nesting indent dimensioned and configured to receive a retainer disposed on the interior wall and the interior wall of the first shell is complementary to the exterior wall of the second shell, thereby allowing the first shell to fit over and against the second shell and form a stack, whereby the nesting indent and the retainer cooperate to stabilize the stack.

50. A modular conduit system comprising:

first and second longitudinally divided shells engageable to form a conduit member defining a longitudinal bore, the first shell having an interior wall and an exterior wall, the second shell having an interior wall and an exterior wall, the first shell including a first engagement structure and the second shell including a second engagement structure wherein the first and second engagement structures are configured to form a longitudinally sliding interlock which interferes with separation of the longitudinally divided shells of the conduit member, wherein the conduit member defines a contiguous interior wall formed from the interior wall of the first shell and the second shell, the contiguous inner wall defining a spare second coupling located between the first and second end portions, wherein the first shell defines a first portion of the spare second coupling and the second shell defines a second portion of the spare second coupling.

51. A modular conduit system comprising:

first and second longitudinally divided shells engageable to form a conduit member defining a longitudinal bore, the first shell having an interior wall and an exterior wall, the second shell having an interior wall and an exterior wall, the first shell including a first engagement structure and the second shell including a second engagement structure wherein the first and second engagement structures are configured to form a longitudinally sliding interlock which interferes with separation of the longitudinally divided shells of the conduit member; and a plurality of interengaging panels that cooperate to form an enclosed containment area, one or more of the panels including a conduit member receiving port dimensioned and configured to allow the conduit member to pass through the panels, wherein the panels include a closure for the port.

* * * * *